United States Patent
Ashrafi et al.

(10) Patent No.: US 10,244,453 B2
(45) Date of Patent: Mar. 26, 2019

(54) METHOD AND APPARATUS FOR INTER-SATELLITE HANDOVERS IN LOW-EARTH ORBIT (LEO) SATELLITE SYSTEMS

(71) Applicant: QUALCOMM Incorporated, San Diego, CA (US)

(72) Inventors: Seyed Shwan Ashrafi, Seattle, WA (US); Sumeeth Nagaraja, San Diego, CA (US); Dan Vassilovski, Del Mar, CA (US); Dan Zhang, San Diego, CA (US); James Determan, Encinitas, CA (US); Gene Wesley Marsh, Encinitas, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 15/149,008

(22) Filed: May 6, 2016

(65) Prior Publication Data
US 2017/0105153 A1  Apr. 13, 2017

Related U.S. Application Data

(60) Provisional application No. 62/241,002, filed on Oct. 13, 2015, provisional application No. 62/241,622, filed on Oct. 14, 2015.

(51) Int. Cl.
*H04W 36/24* (2009.01)
*H04B 17/336* (2015.01)
(Continued)

(52) U.S. Cl.
CPC ...... *H04W 36/245* (2013.01); *H04B 7/18541* (2013.01); *H04B 7/195* (2013.01);
(Continued)

(58) Field of Classification Search
CPC .............. H04B 17/336; H04B 7/18541; H04B 7/18513; H04B 7/18515; H04B 7/18543;
(Continued)

(56) References Cited

U.S. PATENT DOCUMENTS 6,104,911 A * 8/2000 Diekelman ........ H04B 7/18534
342/352
6,137,783 A   10/2000 Sallberg
(Continued)

FOREIGN PATENT DOCUMENTS

FR    2796229 A1    1/2001

OTHER PUBLICATIONS

Partial International Search Report—PCT/US2016/055981—ISA/EPO—dated Sep. 22, 2017.
(Continued)

*Primary Examiner* — Shaima Q Aminzay
(74) *Attorney, Agent, or Firm* — Muncy, Geissler, Olds & Lowe, P.C.

(57) ABSTRACT

Methods and apparatuses for managing inter-satellite handovers are provided to allow a user terminal to reduce the frequency of handovers while maintaining a sufficiently high system capacity in a non-geosynchronous satellite communication system. The method and apparatus for managing inter-satellite handovers may be implemented in a gateway, in infrastructure connected to a gateway, in a user terminal, or in a satellite.

20 Claims, 16 Drawing Sheets

(51) Int. Cl.
*H04B 7/185* (2006.01)
*H04B 7/195* (2006.01)
*H04W 36/30* (2009.01)
*H04W 84/06* (2009.01)

(52) U.S. Cl.
CPC .......... *H04B 17/336* (2015.01); *H04W 36/30* (2013.01); *H04W 84/06* (2013.01)

(58) Field of Classification Search
CPC ........... H04B 7/18567; H04B 7/18508; H04W 36/245; H04W 84/06; H04W 36/00; H04W 36/0066; H04W 36/0072; H04W 36/0083; H04W 36/30
USPC ......... 455/13.1, 12.1, 13.4, 427, 432.1, 436, 455/443, 3.02, 3.03; 342/352; 370/310, 370/315, 318; 375/133
See application file for complete search history.

(56) References Cited

U.S. PATENT DOCUMENTS

| | | | |
|---|---|---|---|
| 6,272,314 | B1 | 8/2001 | Emmons, Jr. et al. |
| 6,512,920 | B1* | 1/2003 | Yaoya ................ H04B 7/18541 455/427 |
| 8,089,937 | B2 | 1/2012 | Hong et al. |
| 2007/0135040 | A1 | 6/2007 | Draim |
| 2007/0281609 | A1* | 12/2007 | Monte ................ H04B 7/18513 455/12.1 |
| 2015/0271730 | A1 | 9/2015 | Benammar et al. |

OTHER PUBLICATIONS

International Search Report and Written Opinion—PCT/US2016/055981—ISA/EPO—dated Nov. 13, 2017.

* cited by examiner

METHOD AND APPARATUS FOR INTER-SATELLITE HANDOVERS IN LOW-EARTH ORBIT (LEO) SATELLITE SYSTEMS

CROSS-REFERENCE TO RELATED APPLICATIONS

The present Application for Patent claims the benefit of U.S. Provisional Application No. 62/241,002, entitled "Method And Apparatus For Inter-Satellite Handovers In Low-Earth Orbit (LEO) Satellite Systems," filed Oct. 13, 2015, and U.S. Provisional Application No. 62/241,622 entitled "Method And Apparatus For Inter-Satellite Handovers In Low-Earth Orbit (LEO) Satellite Systems," filed Oct. 14, 2015, both assigned to the assignee hereof, and expressly incorporated herein by reference in their entirety.

INTRODUCTION

Various aspects described herein relate to satellite communications, and more particularly, to inter-satellite handovers in low-Earth orbit (LEO) satellite communication systems.

Conventional satellite-based communication systems include gateways and one or more satellites to relay communication signals between the gateways and one or more user terminals. A gateway is an Earth station having an antenna for transmitting signals to, and receiving signals from, communication satellites. A gateway provides communication links, using satellites, for connecting a user terminal to other user terminals or users of other communication systems, such as a public switched telephone network, Internet, and various public and/or private networks. A satellite is an orbiting receiver and repeater used to relay information.

A satellite can receive signals from and transmit signals to a user terminal provided the user terminal is within the footprint of the satellite. The footprint of a satellite is the geographic region on the surface of the Earth within the range of signals of the satellite. The footprint is usually geographically divided into beams, through the use of beamforming antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and Doppler frequency shift in radio signal propagation between a communication transceiver on the Earth and the geosynchronous satellite. However, because geosynchronous satellites are limited to a geosynchronous orbit (GSO), which is a circle having a radius of approximately 42,164 km from the center of the Earth directly above the Earth's equator, the number of satellites that may be placed in the GSO is limited. As alternatives to geosynchronous satellites, communication systems that utilize a constellation of satellites in non-geosynchronous orbits, such as low-Earth orbits (LEO), have been devised to provide communication coverage to the entire Earth or at least large parts of the Earth.

In LEO satellite communication systems, user terminals (UTs) may experience frequent inter-satellite handovers due to high velocities of satellites relative to the UTs, turning on, off, or reducing the power of beams of the satellites, and satellites turning on or off. Frequent inter-satellite handovers may result in processing costs on network resources. On the other hand, if the frequency of inter-satellite handovers is arbitrarily limited, system performance may be adversely affected due to degradation of carrier-to-interference-and-noise ratio (CINR), which may result in degraded capacity. Therefore, it is desirable to reduce the frequency of inter-satellite handovers while providing seamless connections to UTs without adversely affecting system performance.

SUMMARY

The following summary is an overview provided solely to aid in the description of various aspects of the disclosure and is provided solely for illustration of the aspects and not limitation thereof.

In one example, a method of managing inter-satellite handovers in a satellite constellation is disclosed. The method may include, for example, determining, relative to a user terminal, a visibility window for one or more candidate satellites in the satellite constellation, wherein the visibility window for each candidate satellite indicates a time interval for the candidate satellite to be visible to the user terminal, and wherein a parameter associated with each candidate satellite exceeds a first threshold; and providing, when a parameter associated with a serving satellite for the user terminal is below a second threshold, a handover to cause the user terminal to be served by a new serving satellite among the one or more candidate satellites, the new serving satellite having a corresponding visibility window with a longest residual time.

In another example, an apparatus for managing inter-satellite handovers in a satellite constellation is disclosed. The apparatus may include, for example, at least one processor and at least one memory coupled to the at least one processor. The at least one processor and the at least one memory being configured to determine, relative to a user terminal, a visibility window for one or more candidate satellites in the satellite constellation, wherein the visibility window for each candidate satellite indicates a time interval for the candidate satellite to be visible to the user terminal, and wherein a parameter associated with each candidate satellite exceeds a first threshold; and provide, when a parameter associated with a serving satellite for the user terminal is below a second threshold, a handover to cause the user terminal to be served by a new serving satellite among the one or more candidate satellites, the new serving satellite having a corresponding visibility window with a longest residual time.

In another example, another apparatus for managing inter-satellite handovers in a satellite constellation is disclosed. The apparatus may include, for example, means for determining, relative to a user terminal, a visibility window for one or more candidate satellites in the satellite constellation, wherein the visibility window for each candidate satellite indicates a time interval for the candidate satellite to be visible to the user terminal, and wherein a parameter associated with each candidate satellite exceeds a first threshold; and means for providing, when a parameter associated with a serving satellite for the user terminal is below a second threshold, a handover to cause the user terminal to be served by a new serving satellite among the one or more candidate satellites, the new serving satellite having a corresponding visibility window with a longest residual time.

In another example, a transitory or non-transitory computer-readable medium is disclosed. The computer-readable medium may have instructions stored thereon that cause at least one processor to perform a method for managing inter-satellite handovers in a satellite constellation that includes determining, relative to a user terminal, a visibility window for one or more candidate satellites in the satellite constellation, wherein the visibility window for each candidate satellite indicates a time interval for each candidate satellite to be visible to the user terminal, and wherein a parameter associated with each candidate satellite exceeds a first threshold; and providing, when a parameter associated with a serving satellite for the user terminal is below a second threshold, a handover to cause the user terminal to be served by a new serving satellite among the one or more candidate satellites, the new serving satellite having a corresponding visibility window with a longest residual time.

In another example, another method of managing inter-satellite handovers in a satellite constellation for a user terminal over a sequence of consecutive time instances $t_1, t_2, t_3, t_4, \ldots, t_{N-1}, t_N$ is disclosed. The method may include, for example, generating a weighted directed acyclic graph (DAG), the weighted DAG comprising a family of sets of vertices $\{V(t_k), k=1, 2, \ldots, N\}$, where each set of vertices $V(t_k)$ is indexed by a time instance $t_k$ and represents satellite identifications (IDs) in a set of satellites visible to the user terminal at the time instance $t_k$, and a family of sets of arcs $\{A(t_k), k=2, \ldots, N\}$, where $A(t_k)$ is the set of arcs beginning with the set of vertices $V(t_{k-1})$ and ending with the set of vertices $V(t_k)$, where each arc in the set $A(t_k)$ is an ordered pair $(s_i, s_j)$ where $s_i$ is a satellite ID in the set $V(t_{k-1})$ and $s_j$ is a satellite ID in the set $V(t_k)$, where each arc $(s_i, s_j)$ represents a handover at the time instance $t_k$ for the user terminal from the satellite with satellite ID $s_i$ to the satellite with satellite ID $s_j$; and weighting each arc $(s_i, s_j)$ at each time instance $t_k$ with a corresponding weight $w_{ij}(t_k)$ representing a cost associated with the handover at the time instance $t_k$ for the user terminal from the satellite with satellite ID $s_i$ to the satellite with satellite ID $s_j$.

In another example, another apparatus for managing inter-satellite handovers in a satellite constellation for a user terminal over a sequence of consecutive time instances $t_1, t_2, t_3, t_4, \ldots, t_{N-1}, t_N$, is disclosed. The apparatus may include, for example, at least one processor and at least one memory coupled to the at least one processor. The at least one processor and the at least one memory may be configured to generate a weighted directed acyclic graph (DAG), the weighted DAG comprising a family of sets of vertices $\{V(t_k), k=1, 2, \ldots, N\}$, where each set of vertices $V(t_k)$ is indexed by a time instance $t_k$ and represents satellite identifications (IDs) in a set of satellites visible to the user terminal at the time instance $t_k$, and a family of sets of arcs $\{A(t_k), k=2, \ldots, N\}$, where $A(t_k)$ is the set of arcs beginning with the set of vertices $V(t_{k-1})$ and ending with the set of vertices $V(t_k)$, where each arc in the set $A(t_k)$ is an ordered pair $(s_i, s_j)$ where $s_i$ is a satellite ID in the set $V(t_{k-1})$ and $s_j$ is a satellite ID in the set $V(t_k)$, where each arc $(s_i, s_j)$ represents a handover at the time instance $t_k$ for the user terminal from the satellite with satellite ID $s_i$ to the satellite with satellite ID $s_j$; and weight each arc $(s_i, s_j)$ at each time instance $t_k$ with a corresponding weight $w_{ij}(t_k)$ representing a cost associated with the handover at the time instance $t_k$ for the user terminal from the satellite with the satellite ID $s_1$ to the satellite with the satellite ID $s_j$.

In another example, another apparatus for managing inter-satellite handovers in a satellite constellation for a user terminal over a sequence of consecutive time instances $t_1, t_2, t_3, t_4, \ldots, t_{N-1}, t_N$ is disclosed. The apparatus may include, for example, means for generating a weighted directed acyclic graph (DAG), the weighted DAG comprising a family of sets of vertices $\{V(t_k), k=1, 2, \ldots, N\}$, where each set of vertices $V(t_k)$ is indexed by a time instance $t_k$ and represents satellite identifications (IDs) in a set of satellites visible to the user terminal at the time instance $t_k$, and a family of sets of arcs $\{A(t_k), k=2, \ldots, N\}$, where $A(t_k)$ is the set of arcs beginning with the set of vertices $V(t_{k-1})$ and ending with the set of vertices $V(t_k)$, where each arc in the set $A(t_k)$ is an ordered pair $(s_i, s_j)$ where $s_i$ is a satellite ID in the set $V(t_{k-1})$ and $s_j$ is a satellite ID in the set $V(t_k)$, where each arc $(s_i, s_j)$ represents a handover at the time instance $t_k$ for the user terminal from the satellite with satellite ID $s_i$ to the satellite with satellite ID $s_j$; and means for weighting each arc $(s_i, s_j)$ at each time instance $t_k$ with a corresponding weight $w_{ij}(t_k)$ representing a cost associated with the handover at the time instance $t_k$ for the user terminal from the satellite with the satellite ID $s_i$ to the satellite with the satellite ID $s_j$.

In another example, another transitory or non-transitory computer-readable medium is disclosed. The computer-readable medium may have instructions stored thereon that cause at least one processor to perform a method for managing handovers in a satellite constellation for a user terminal over a sequence of consecutive time instances $t_1, t_2, t_3, t_4, \ldots, t_{N-1}, t_N$ that includes generating a weighted directed acyclic graph (DAG), the weighted DAG comprising a family of sets of vertices $\{(t_k), k=1, 2, \ldots, N\}$, where each set of vertices $V(t_k)$ is indexed by a time instance $t_k$ and represents satellite identifications (IDs) in a set of satellites visible to the user terminal at the time instance $t_k$, and a family of sets of arcs $\{A(t_k), k=2, \ldots, N\}$, where $A(t_k)$ is the set of arcs beginning with the set of vertices $V(t_{k-1})$ and ending with the set of vertices $V(t_k)$, where each arc in the set $A(t_k)$ is an ordered pair $(s_i, s_j)$ where $s_i$ is a satellite ID in the set $V(t_{k-1})$ and $s_j$ is a satellite ID in the set $V(t_k)$, where each arc $(s_i, s_j)$ represents a handover at the time instance $t_k$ for the user terminal from the satellite with satellite ID $s_i$ to the satellite with satellite ID $s_j$; and weighting each arc $(s_i, s_j)$ at each time instance $t_k$ with a corresponding weight $w_{ij}(t_k)$ representing a cost associated with the handover at the time instance $t_k$ for the user terminal from the satellite with the satellite ID $s_i$ to the satellite with the satellite ID $s_j$.

In another example, another method of managing inter-satellite handover is disclosed. The method may include, for example, determining a visibility of a first candidate satellite; determining a parameter associated with a received signal from the first candidate satellite; determining a weight based on the visibility of the first candidate satellite and the parameter associated with the received signal from the first candidate satellite; and determining whether to hand over communication from a current serving satellite to the first candidate satellite based on the weight.

In another example, another apparatus is disclosed. The apparatus may include, for example, at least one processor and at least one memory coupled to the at least one processor. The at least one processor and the at least one memory may be configured to determine a visibility of a first candidate satellite; determine a parameter associated with a received signal from the first candidate satellite; determine a weight based on the visibility of the first candidate satellite and the parameter associated with the received signal from the first candidate satellite; and determine whether to hand over communication from a current serving satellite to the first candidate satellite based on the weight.

In another example, another apparatus is disclosed. The apparatus may include, for example, means for determining a visibility of a first candidate satellite; means for determining a parameter associated with a received signal from the first candidate satellite; means for determining a weight based on the visibility of the first candidate satellite and the parameter associated with the received signal from the first candidate satellite; and means for determining whether to hand over communication from a current serving satellite to the first candidate satellite based on the weight.

In another example, another transitory or non-transitory computer-readable medium is disclosed. The computer-readable medium may have instructions stored thereon that cause at least one processor to perform a method including determining a visibility of a first candidate satellite; determining a parameter associated with a received signal from the first candidate satellite; determining a weight based on the visibility of the first candidate satellite and the parameter associated with the received signal from the first candidate satellite; and determining whether to hand over communication from a current serving satellite to the first candidate satellite based on the weight.

DETAILED DESCRIPTION

Figure 1:
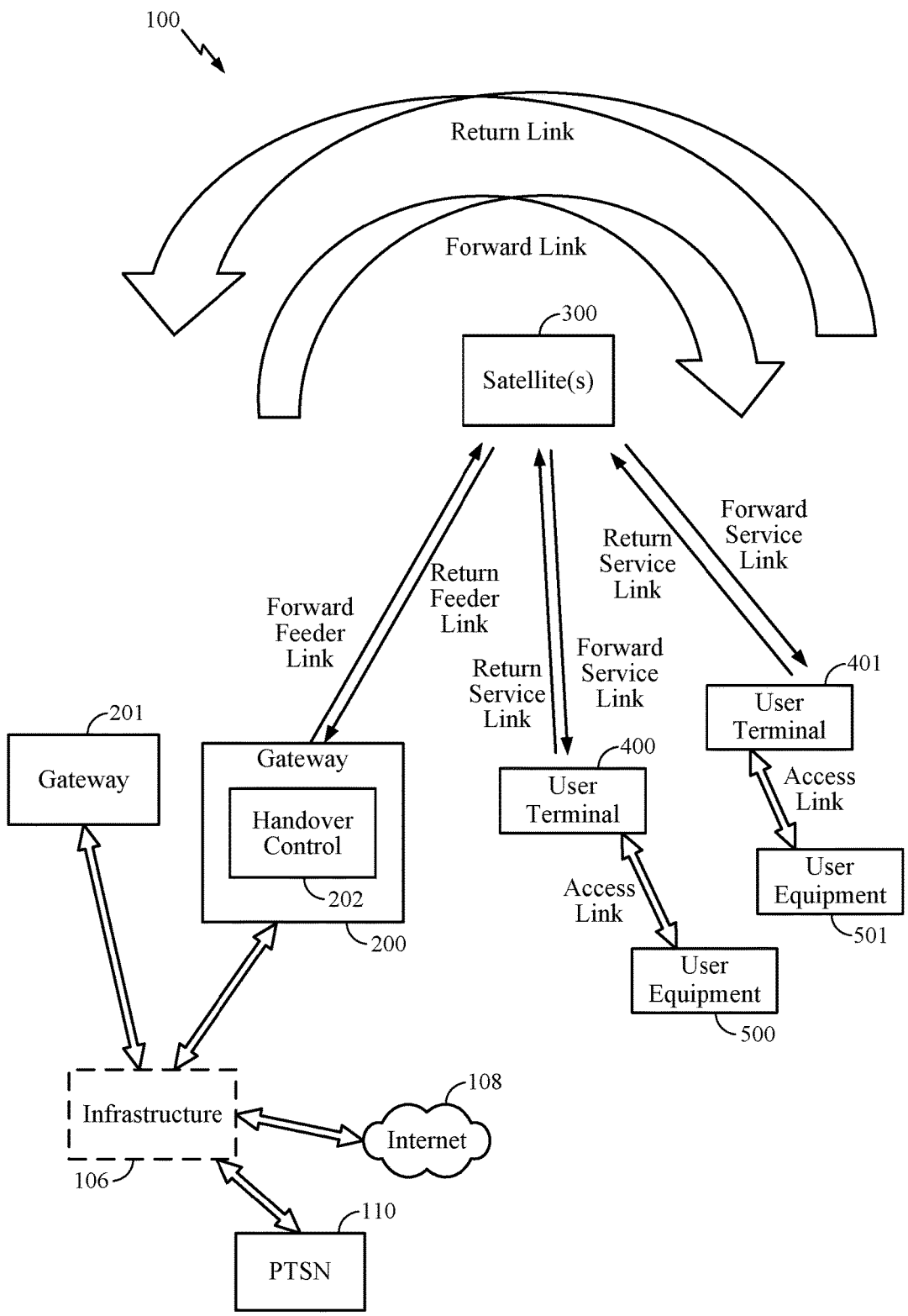
FIG. 1 is a block diagram of an example satellite communication system.

In non-geosynchronous satellite communication systems, such as low-earth-orbit (LEO) satellite communication systems, a large number of satellites are typically required to form a constellation, to allow ground stations including gateways and user terminals (UTs) to maintain communications even though each individual satellite in the constellation is not at a fixed location with respect to the ground stations at different instants of time. In some implementations, in order to reduce the cost of making each satellite in an LEO satellite communication system, each satellite may serve as a bent-pipe relay or transponder, that is, without its own data processing. In such implementations, the gateway and/or the UT may manage handovers of communications from one satellite to another.

In other implementations, each satellite may be equipped with one or more processors and/or one or more memories to process data instead of simply serving as a bent-pipe relay or transponder. In such implementations, the satellite may manage inter-satellite handovers. For example, the satellite may manage inter-satellite handovers based on one or more parameters, examples of which will be described below, transmitted by the gateway and/or UT to the satellite. Alternatively, the gateway and/or the UT may manage inter-satellite handovers without requiring on-board processing by the satellite.

Specific examples of the disclosure are described in the following description and related drawings. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein is for the purpose of describing particular aspects only and is not intended to be limiting of the aspects. As used herein, the singular forms "a," "an," and "the" are intended to include the plural forms as well, unless the context clearly indicates otherwise. It will be further understood that the terms "comprises," "comprising," "includes," or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to," or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, the sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

FIG. 1 illustrates an example of a satellite communication system 100 which includes a plurality of satellites (although only one satellite 300 is shown for clarity of illustration) in non-geosynchronous orbits, for example, low-earth orbits (LEO), a gateway 200 in communication with the satellite 300, a plurality of user terminals (UTs) 400 and 401 in communication with the satellite 300, and a plurality of user equipment (UE) 500 and 501 in communication with the UTs 400 and 401, respectively. In one aspect, to be described in more detail later, the gateway 200 includes the handover control 202 for providing inter-satellite handover control information to the various UTs. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate with one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UEs (not shown) may be configured to receive only and therefore communicate with a UT only using a forward access link. In another implementation, one or more additional UEs (not shown) may also communicate with the UT 400 or UT 401. Alternatively, a UT and a corresponding UE may be integral parts of a single physical device, such as a mobile telephone with an integral satellite transceiver and an antenna for communicating directly with a satellite, for example.

The gateway 200 may have access to Internet 108 or one or more other types of public, semiprivate, or private networks. In the example illustrated in FIG. 1, the gateway 200 is in communication with infrastructure 106, which is capable of accessing the Internet 108 or one or more other types of public, semiprivate, or private networks. The gateway 200 may also be coupled to various types of communication backhaul, including, for example, landline networks such as optical fiber networks or public switched telephone networks (PSTN) 110. Further, in alternative implementations the gateway 200 may interface to the Internet 108, the PSTN 110, or one or more other types of public, semiprivate, or private networks without using the infrastructure 106. Furthermore, the gateway 200 may communicate with other gateways, such as gateway 201 through the infrastructure 106 or alternatively may be configured to communicate with the gateway 201 without using the infrastructure 106. The infrastructure 106 may include, in whole or part, a network control center (NCC), a satellite control center (SCC), a wired and/or wireless core network, and/or any other components or systems used to facilitate operation of and/or communication with the satellite communication system 100.

Communications between the satellite 300 and the gateway 200 in both directions are called feeder links, whereas communications between the satellite 300 and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" whereas the signal path from the satellite 300 to the gateway 200 is labeled "Return Feeder Link" in FIG. 1. In a similar manner, the signal path from each UT 400 or 401 to the satellite 300 is labeled "Return Service Link" whereas the signal path from the satellite 300 to each UT 400 or 401 is labeled "Forward Service Link" in FIG. 1.

Figure 2:
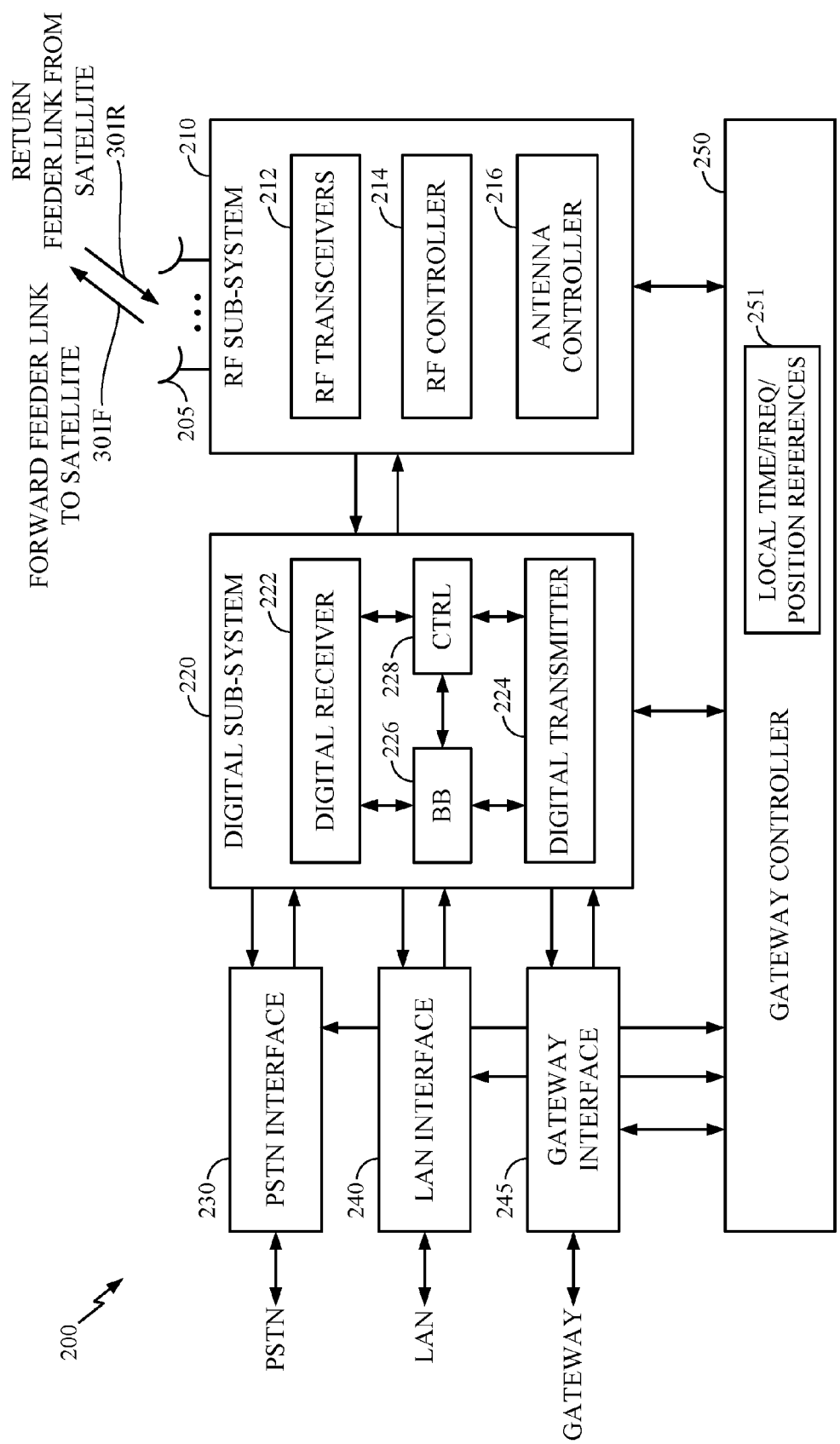
FIG. 2 is a block diagram of one example of the gateway of FIG. 1.

FIG. 2 is an example block diagram of the gateway 200, which also can apply to the gateway 201 of FIG. 1. The gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. The RF subsystem 210 is coupled to the antennas 205 and to the digital subsystem 220. The digital subsystem 220 is coupled to the PSTN interface 230, to the LAN interface 240, and to the gateway interface 245. The gateway controller 250 is coupled to the RF subsystem 210, the digital subsystem 220, the PSTN interface 230, the LAN interface 240, and the gateway interface 245.

The RF subsystem 210, which may include a number of RF transceivers 212, an RF controller 214, and an antenna controller 216, may transmit communication signals to the satellite 300 via a forward feeder link 301F, and may receive communication signals from the satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by the digital subsystem 220). Each transmit chain may include an up-converter (e.g., a mixer) and a power amplifier (PA) to up-convert and amplify, respectively, communication signals to be transmitted to the satellite 300 in a well-known manner. In addition, each transmit chain may include a digital-to-analog converter (DAC) to convert the digital signals received from the digital subsystem 220 to analog signals to be transmitted to the satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. The digital subsystem 220 may process communication signals received from the RF subsystem 210 and forward the processed communication signals to the PSTN interface 230 and/or the LAN interface 240, and may process communication signals received from the PSTN interface 230 and/or the LAN interface 240 and forward the processed communication signals to the RF subsystem 210.

Each digital receiver module 222 may correspond to signal processing elements used to manage communications between the gateway 200 and the UT 400. One of the receive chains of the RF transceivers 212 may provide input signals to the digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to the UT 400 via the satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The CTRL processor 228, which is coupled to the digital receiver modules 222, the digital transmitter modules 224, and the BB processor 226, may provide command and control signals to effect functions such as, but not limited to, signal processing, timing signal generation, power control, handoff control, diversity combining, and system interfacing.

The CTRL processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

The BB processor 226 is well known in the art and is therefore not described in detail herein. For example, the BB processor 226 may include a variety of known elements such as (but not limited to) coders, data modems, and digital data switching and storage components.

The PSTN interface 230 may provide communication signals to, and receive communication signals from, an external PSTN either directly or through the infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects the gateway 200 to a ground-based network (e.g., the Internet 108).

The LAN interface 240 may provide communication signals to, and receive communication signals from, an external LAN. For example, the LAN interface 240 may be coupled to the Internet 108 either directly or through the infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, the gateway interface 245 may communicate with other gateways via one or more dedicated communication lines or channels (not shown for simplicity). For other implementations, the gateway interface 245 may communicate with other gateways using the PSTN interface 230 and/or other networks such as the Internet 108 (see also FIG. 1). For at least one implementation, the gateway interface 245 may communicate with other gateways via the infrastructure 106.

Overall gateway control may be provided by the gateway controller 250. The gateway controller 250 may plan and control utilization of the satellite 300's resources by the gateway 200. For example, the gateway controller 250 may analyze trends, generate traffic plans, allocate satellite resources, monitor (or track) satellite positions, and monitor the performance of the gateway 200 and/or the satellite 300. The gateway controller 250 may also be coupled to a ground-based satellite controller (not shown for simplicity) that maintains and monitors orbits of the satellite 300, relays satellite usage information to the gateway 200, tracks the positions of the satellite 300, and/or adjusts various channel settings of the satellite 300.

For the example implementation illustrated in FIG. 2, the gateway controller 250 includes a local time, frequency, and position references 251, which may provide local time or frequency information to the RF subsystem 210, the digital subsystem 220, and/or the interfaces 230, 240, and 245. The time or frequency information may be used to synchronize the various components of the gateway 200 with each other and/or with the satellite 300. The local time, frequency, and position references 251 may also provide position information (e.g., ephemeris data) of the satellite 300 to the various components of the gateway 200. Further, although depicted in FIG. 2 as included within the gateway controller 250, for other implementations, the local time, frequency, and position references 251 may be a separate subsystem that is coupled to the gateway controller 250 (and/or to one or more of the digital subsystem 220 and the RF subsystem 210).

Although not shown in FIG. 2 for simplicity, the gateway controller 250 may also be coupled to a network control center (NCC) and/or a satellite control center (SCC). For example, the gateway controller 250 may allow the SCC to communicate directly with the satellite 300, for example, to retrieve ephemeris data from the satellite 300. The gateway controller 250 may also receive processed information (e.g., from the SCC and/or the NCC) that allows the gateway controller 250 to properly aim the antennas 205 (e.g., at the satellite 300), to schedule beam transmissions, to coordinate handovers, and to perform various other well-known functions.

Figure 3:
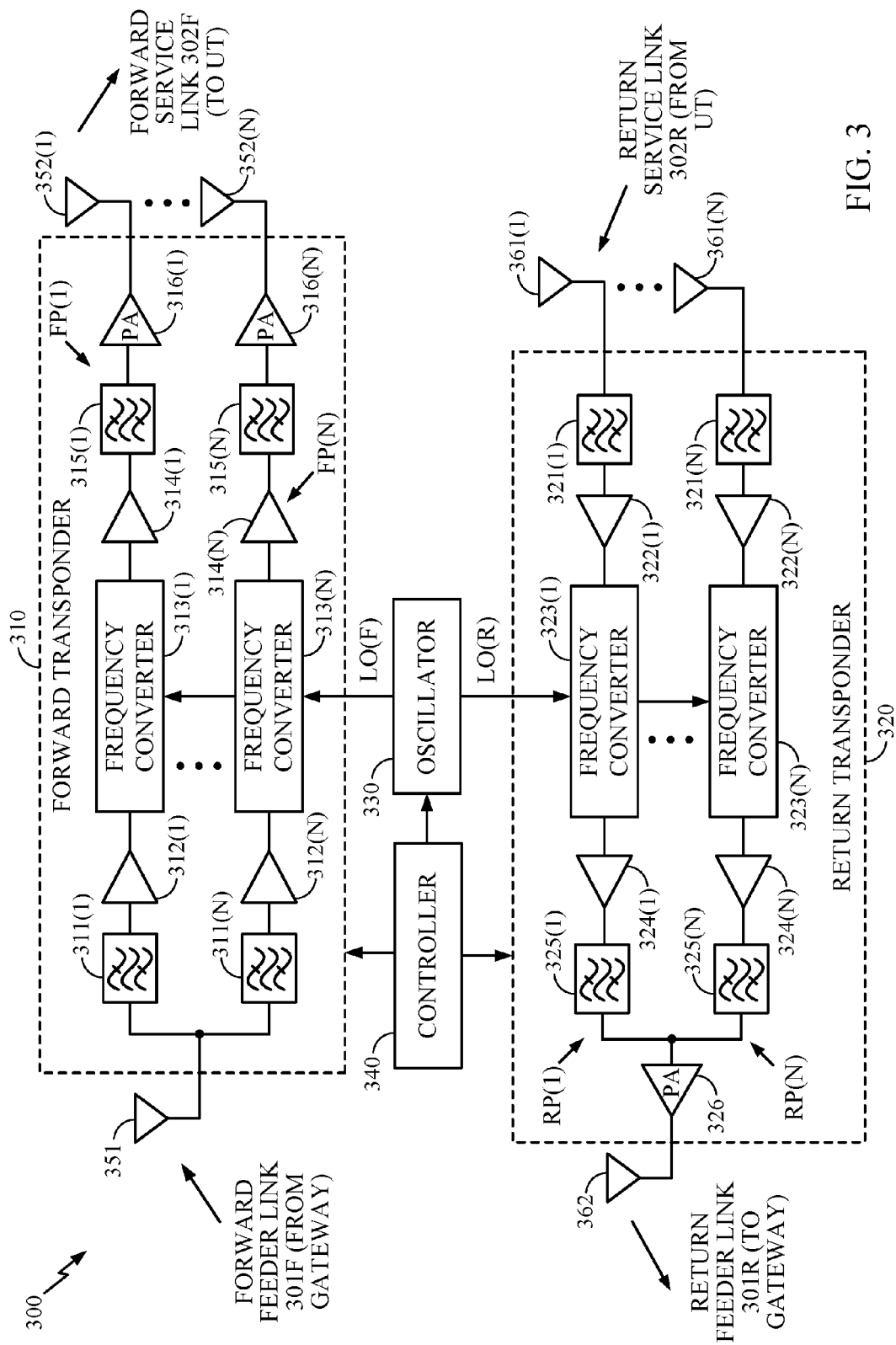
FIG. 3 is a block diagram of one example of the satellite of FIG. 1.

FIG. 3 is an example block diagram of the satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and the UT 400. It will be appreciated that the disclosure is not limited to any specific satellite configuration and any satellite or combinations of satellites that can provide the functional connection between the gateway 200 and the UT 400 can be considered within the scope of the disclosure. In one example, the satellite 300 is shown to include a forward transponder 310, a return transponder 320, an oscillator 330, a controller 340, forward link antennas 352(1)-352(N), and return link antennas 361(1)-361(N). The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of the forward link antennas 352(1)-352(N), as shown in FIG. 3.

Within a respective one of forward paths FP(1)-FP(N), the first bandpass filters 311(1)-311(N) pass signal components having frequencies within the channel or frequency band of the respective forward paths FP(1)-FP(N), and filter signal components having frequencies outside the channel or frequency band of the respective forward paths FP(1)-FP(N). Thus, the pass bands of the first bandpass filters 311(1)-311(N) correspond to the width of the channel associated with the respective forward paths FP(1)-FP(N). The first LNAs 312(1)-312(N) amplify the received communication signals to a level suitable for processing by the frequency converters 313(1)-313(N). The frequency converters 313(1)-313(N) convert the frequency of the communication signals in the respective forward paths FP(1)-FP(N) (e.g., to a frequency suitable for transmission from the satellite 300 to the UT 400). The second LNAs 314(1)-314(N) amplify the frequency-converted communication signals, and the second bandpass filters 315(1)-315(N) filter signal components having frequencies outside of the associated channel width. The PAs 316(1)-316(N) amplify the filtered signals to a power level suitable for transmission to the UT 400 via the respective forward link antennas 352(1)-352(N). The return transponder 320, which includes a number N of return paths RP(1)-RP(N), receives communication signals from the UT 400 along return service link 302R via the return link antennas 361(1)-361(N), and transmits communication signals to the gateway 200 along return feeder link 301R via one or more antennas 362. Each of the return paths RP(1)-RP(N), which may process communication signals within a corresponding channel or frequency band, may be coupled to a respective one of the return link antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filters 321(1)-321(N) pass signal components having frequencies within the channel or frequency band of the respective return paths RP(1)-RP(N), and filter signal components having frequencies outside the channel or frequency band of the respective return paths RP(1)-RP(N). Thus, the pass bands of the first bandpass filters 321(1)-321(N) may for some implementations correspond to the width of the channel associated with the respective return paths RP(1)-RP(N). The first LNAs 322(1)-322(N) amplify all the received communication signals to a level suitable for processing by the frequency converters 323(1)-323(N). The frequency converters 323(1)-323(N) convert the frequency of the communication signals in the respective return paths RP(1)-RP(N) (e.g., to a frequency suitable for transmission from the satellite 300 to the gateway 200). The second LNAs 324(1)-324(N) amplify the frequency-converted communication signals, and the second bandpass filters 325(1)-325(N) filter signal components having frequencies outside of the associated channel width. Signals from the return paths RP(1)-RP(N) are combined and provided to the one or more antennas 362 via a PA 326. The PA 326 amplifies the combined signals for transmission to the gateway 200.

The oscillator 330, which may be any suitable circuit or device that generates an oscillating signal, provides a forward local oscillator LO(F) signal to the frequency converters 313(1)-313(N) of the forward transponder 310, and provides a return local oscillator LO(R) signal to the frequency converters 323(1)-323(N) of the return transponder 320. For example, the LO(F) signal may be used by the frequency converters 313(1)-313(N) to convert communication signals from a frequency band associated with the transmission of signals from the gateway 200 to the satellite 300 to a frequency band associated with the transmission of signals from the satellite 300 to the UT 400. The LO(R) signal may be used by the frequency converters 323(1)-323(N) to convert communication signals from a frequency band associated with the transmission of signals from the UT 400 to the satellite 300 to a frequency band associated with the transmission of signals from the satellite 300 to the gateway 200.

The controller 340, which is coupled to the forward transponder 310, the return transponder 320, and the oscillator 330, may control various operations of the satellite 300 including (but not limited to) channel allocations. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein.

Figure 4:
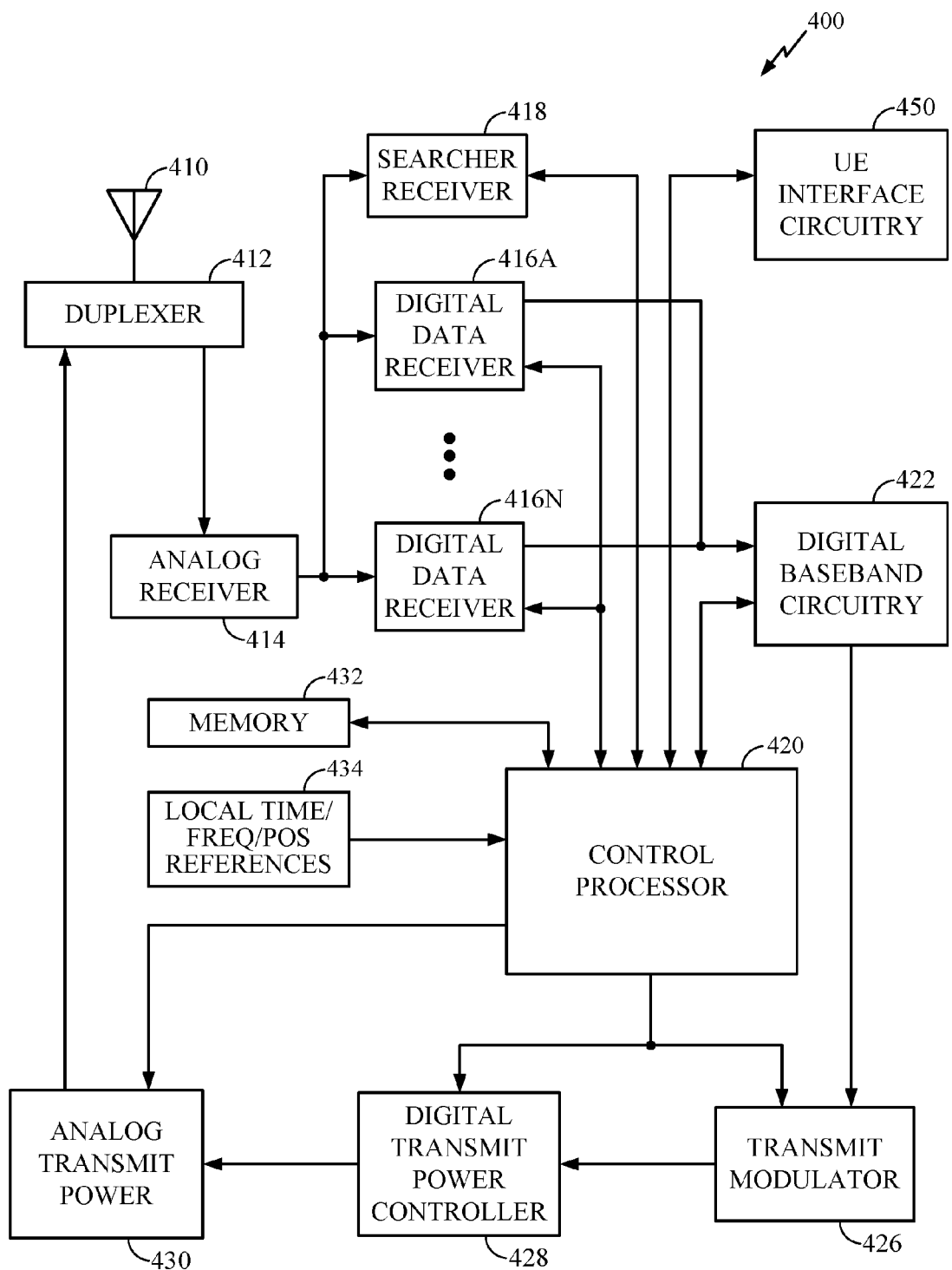
FIG. 4 is a block diagram of one example of the user terminal of FIG. 1.

An example of a transceiver for use in the UT 400 or 401 is illustrated in FIG. 4. In FIG. 4, at least one antenna 410 is provided for receiving forward link communication signals (e.g., from the satellite 300), which are transferred to an analog receiver 414, where they are down-converted, amplified, and digitized. A duplexer element 412 is often used to allow the same antenna 410 to serve both transmit and receive functions. Alternatively, the UT 400 may employ separate antennas 410 for operating at different transmit and receive frequencies.

The digital communication signals output by the analog receiver 414 are transferred to at least one digital data receiver 416A-416N and at least one searcher receiver 418. The digital data receivers 416A-416N can be used to obtain desired levels of signal diversity, depending on the acceptable level of transceiver complexity, as would be apparent to one skilled in the relevant art.

At least one control processor 420 is coupled to the digital data receivers 416A-416N and the searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of the digital data receivers 416A-416N are coupled to digital baseband circuitry 422 within the UT 400. The digital baseband circuitry 422 comprises processing and presentation elements used to transfer information to and from the UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, the control processor 420.

When voice or other data is prepared as an output message or communications signal originating with the UT 400, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a digital transmit power controller 428 which provides output power control to an analog transmit power amplifier 430 for final transmission of the output signal from the antenna 410 to a satellite (e.g., the satellite 300).

In FIG. 4, the UT 400 also includes a memory 432 associated with the control processor 420. The memory 432 may include instructions for execution by the control processor 420 as well as data for processing by the control processor 420. In the example illustrated in FIG. 4, the memory 432 may include instructions for performing time or frequency adjustments to be applied to an RF signal to be transmitted by the UT 400 via the return service link 302R to the satellite 300.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time or frequency synchronization for the UT 400.

The digital data receivers 416A-N and the searcher receiver 418 are configured with signal correlation elements to demodulate and track specific signals. The searcher receiver 418 is used to search for pilot signals, or other relatively strong fixed pattern signals, while the digital data receivers 416A-N are used to demodulate other signals associated with detected pilot signals. However, the digital data receivers 416A-N can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These digital data receivers 416A-N also employ frequency tracking elements that can be monitored to provide current frequency and timing information to the control processor 420 for signals being demodulated.

The control processor 420 may use such information to determine to what extent the received signals are offset from the oscillator frequency, when scaled to the same frequency band, as appropriate. This, and other information related to frequency errors and frequency shifts, can be stored in the memory 432 as desired.

The control processor 420 may also be coupled to UE interface circuitry 450 to allow communications between the UT 400 and one or more UEs. The UE interface circuitry 450 may be configured as desired for communication with various UE configurations and accordingly may include various transceivers and related components depending on the various communication technologies employed to communicate with the various UEs supported. For example, the UE interface circuitry 450 may include (not shown) one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with the UT 400.

Figure 5:
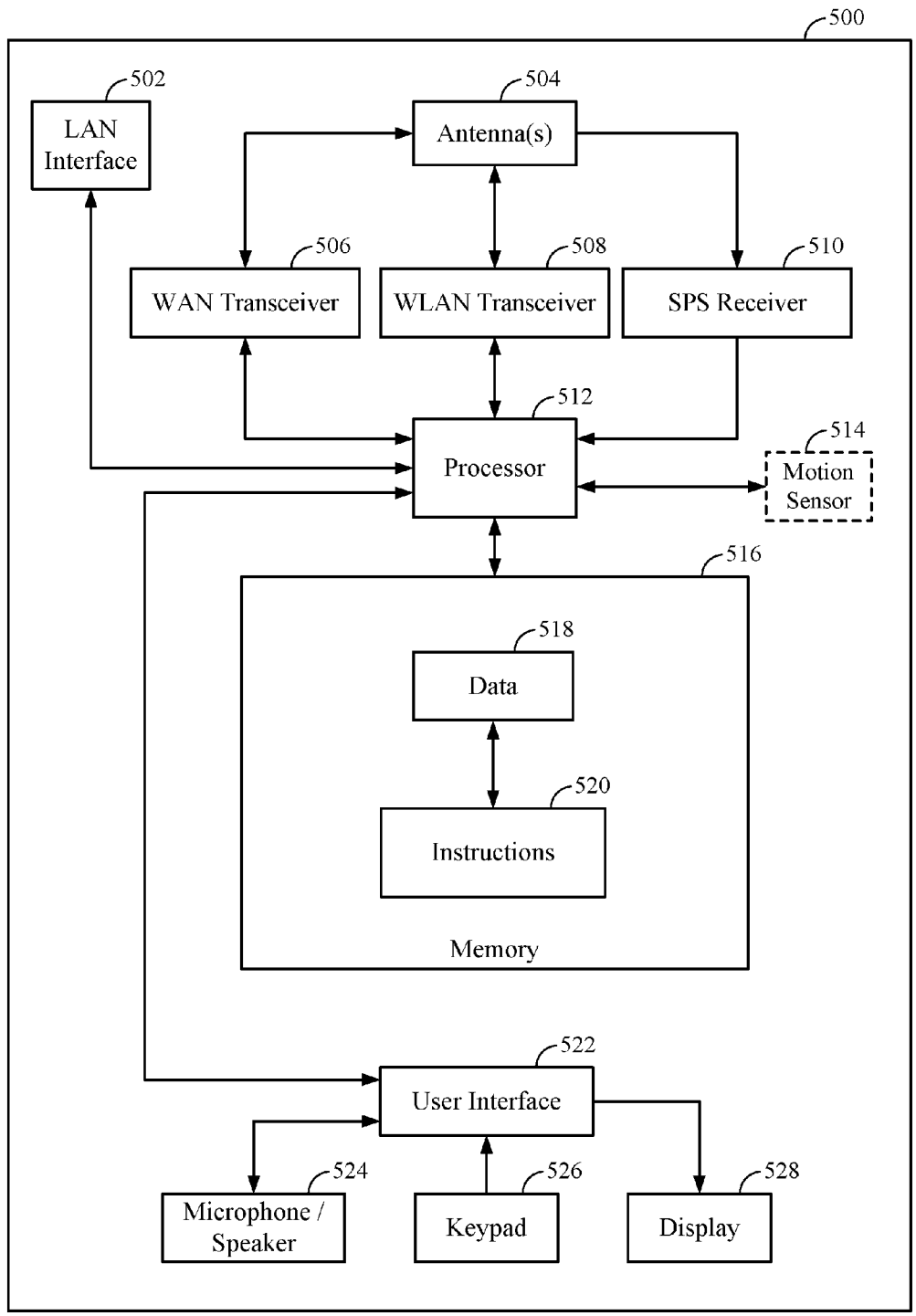
FIG. 5 is a block diagram of one example of the user equipment of FIG. 1.

FIG. 5 is a block diagram illustrating an example of the UE 500, which also can apply to the UE 501 of FIG. 1. The UE 500 as shown in FIG. 5 may be a mobile device, a handheld computer, a tablet, a wearable device, a smart watch, or any type of device capable of interacting with a user, for example. Additionally, the UE 500 may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with Global Positioning System (GPS), Global Navigation Satellite System (GLONASS) and/or any other global or regional satellite based positioning system. In an alternate aspect, the UE 500 may include the WLAN transceiver 508, such as a Wi-Fi transceiver, with or without the LAN interface 502, the WAN transceiver 506, and/or the SPS receiver 510, for example. Further, the UE 500 may include additional transceivers such as Bluetooth®, ZigBee®, and other known technologies, with or without the LAN interface 502, the WAN transceiver 506, the WLAN transceiver 508 and/or the SPS receiver 510. Accordingly, the elements illustrated for the UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 that may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with, but separate from, the UT 400 as illustrated in FIG. 1, for example. Alternatively, the UE 500 and the UT 400 may be integral parts of a single physical device.

As illustrated in FIG. 1, a network of LEO communication satellites, such as the satellite 300, relays traffic between one or more of the gateways 200, 201 and the user terminals (UTs) 400, 401. Due to the mobility of LEO satellites relative to UTs, the radio communication of a UT may transition among different satellites that provide coverage to a UT.

Figure 6B:
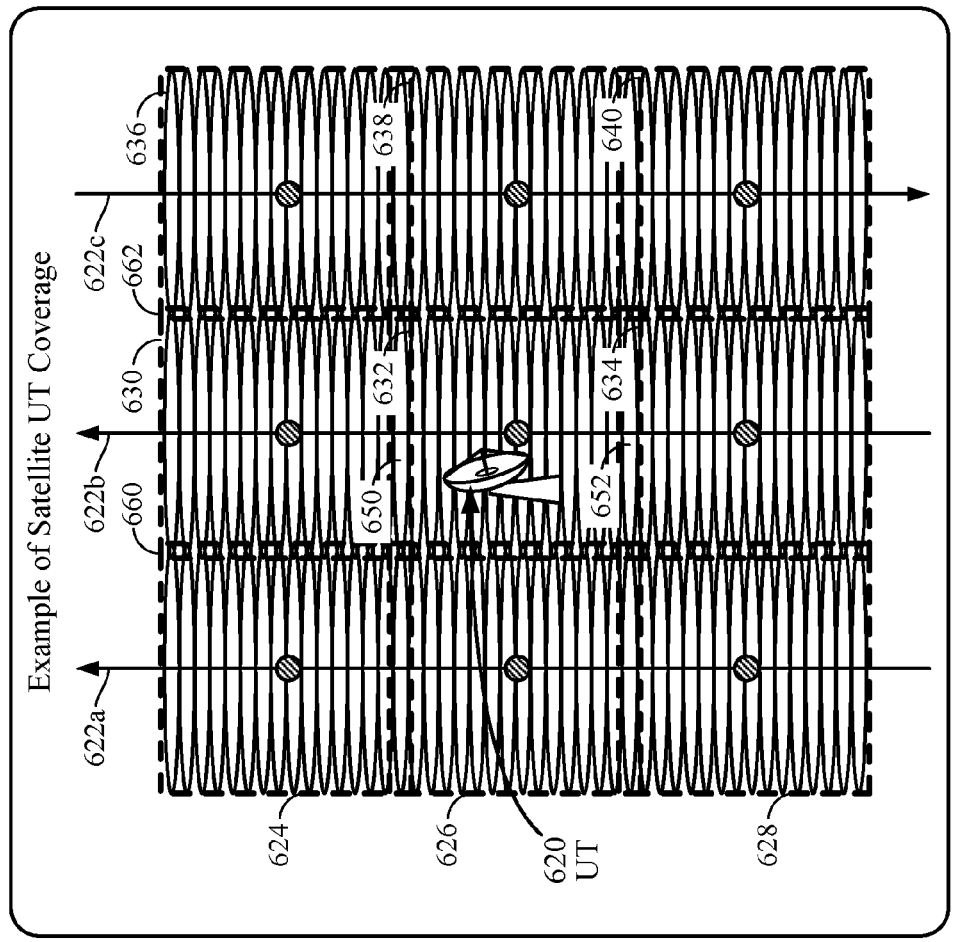
FIG. 6B is a diagram illustrating an example of coverage of a single user terminal by nine satellites in LEO orbits.
Figure 6A:
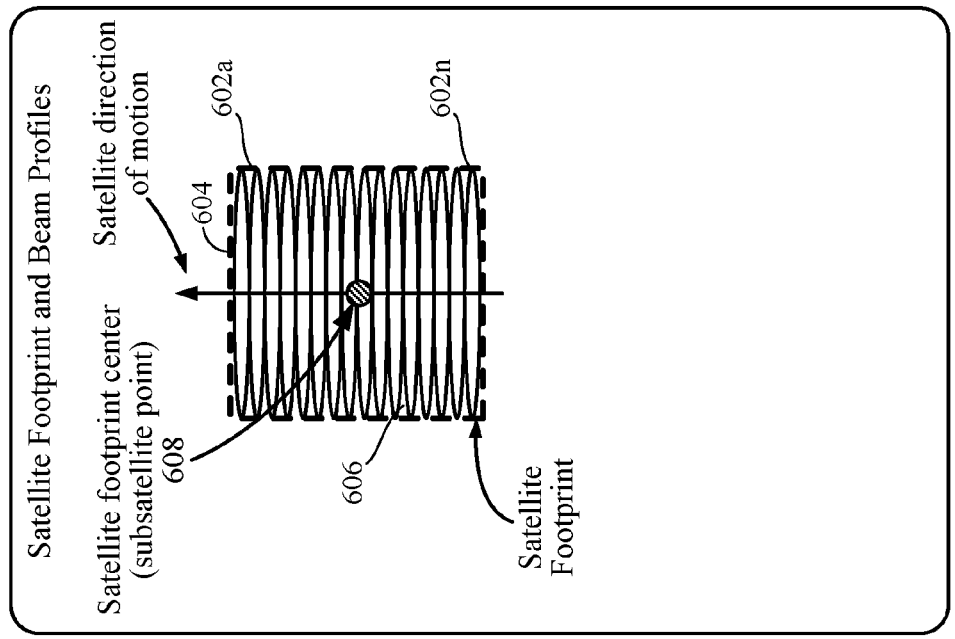
FIG. 6A is a diagram illustrating an example of satellite footprint and beam profiles in an LEO satellite communication system.

FIG. 6A is a diagram illustrating an example of a satellite footprint and beam profiles in an LEO satellite communication system. In this example, the satellite has multiple antennas having elliptical beam patterns 602a . . . 602n stacked in the direction of satellite motion indicated by a vertical arrow 604. As shown in FIG. 6A, the elliptical beam patterns 602a . . . 602n form a satellite footprint illustrated by a dashed rectangle or square 606. As illustrated in FIG. 6A, a center 608 of the satellite footprint is also called a subsatellite point. In an example of an LEO satellite communication system with multiple satellites, each of the satellites covers an equal amount of footprint, that is, an equal amount of area on the surface of the Earth.

FIG. 6B is a diagram illustrating an example of coverage of a single UT 620 by nine satellites in LEO orbits. In FIG. 6B, the three vertical arrows 622a, 622b and 622c denote the directions of the motions of the satellites within their individual orbital planes. In the example illustrated in FIG. 6B, the first and second vertical arrows 622a and 622b are parallel and in the same direction, whereas the third vertical arrow 622c is in parallel with but opposite to the direction of the first and second vertical arrows 622a and 622b.

In the example shown in FIG. 6B, a first set of three satellites have respective footprints 624, 626 and 628 in the direction indicated by the first vertical arrow 622a, a second set of three satellites have respective footprints 630, 632 and 634 in the direction indicated by the second vertical arrow 622b, and a third set of three satellites have respective footprints 636, 638 and 640 in the direction indicated by the third vertical arrow 622c. The first set of footprints 624, 626 and 628 are part of an orbital plane along the direction indicated by the first vertical arrow 622a, the second set of footprints 630, 632 and 634 are part of an orbital plane along the direction indicated by the second vertical arrow 622b, and the third set of footprints 636, 638 and 640 are part of an orbital plane along the direction indicated by the third vertical arrow 622c. In the example illustrated in FIG. 6B, three orbital planes are shown, and three satellite footprints are shown within each orbital plane for simplicity of illustration, although an actual LEO satellite constellation may include many more beams per satellite, and many more satellites within each plane and many more orbital planes.

In FIG. 6B, which is shown from the perspective of the UT 620 on the Earth, the satellites move along their orbital planes relative to the UT 620 over time. As the satellites move, their coverage areas change over time. As the satellites move or change their beam transmit power levels, the UT 620 needs to be handed over from one satellite to the next on the forward service and reverse service links, thereby regularly changing serving satellites through an inter-satellite handover process. A satellite is said to be the serving satellite for a UT when it is capable of direct communication with the UT, regardless of whether it is in a connected mode or an idle mode. It will therefore be appreciated that the suite of algorithms disclosed herein are applicable to not only a UT in connected mode, but also a UT in idle mode.

The footprints of adjacent satellites in an LEO satellite constellation may have areas of overlap to provide continuous coverage. For example, as illustrated in FIG. 6B, the footprints 630 and 632 shared an overlapped area 650, and the footprints 632 and 634 shared an overlapped area 652 along the orbital plane in the direction indicated by the second vertical arrow 622b. Furthermore, there may be overlapped areas between adjacent satellite footprints along adjacent orbital planes. For example, as illustrated in FIG. 6B, the footprints 624 and 630 share an overlapped area 660, and the footprints 630 and 636 share an overlapped area 662. In the example illustrated in FIG. 6B, the overlapped areas 650 and 652 are shown for simplicity of illustration, although in an actual LEO satellite constellation, there may be multiple footprints with overlaps, and the relative size of the overlaps may be significant.

A UT located in a region of satellite coverage overlap may experience frequent inter-satellite handovers or handoffs (ISHOs). Frequent ISHOs may result in poor resource utilization. On the other hand, if the number of ISHOs is arbitrarily limited, then the satellite that is forced to remain as the serving satellite for the UT at or close to the edge of the beam coverage of the satellite, thereby resulting in degraded carrier-to-interference-and-noise ratio (CINR) and reduced performance and capacity. Methods and apparatus for managing inter-satellite handovers are provided to reduce the number of handovers while maintaining certain quality of service requirements.

In one aspect, a number of assumptions are made for a method of managing inter-satellite handovers. In one example, a gateway provides a handover table that contains satellite ID, beam ID, time to measure and switch satellites. The handover table may contain entries for multiple satellites over a period of time. In one aspect, the gateway is assumed to have perfect knowledge of the location and velocity of the UT, the locations and velocities of the satellites in the LEO satellite constellation, the satellite beam parameters, and any errors associated with these values. In practice, the locations and velocities as well as beam parameters of the satellites in their orbits are known to the satellite communication system, and these parameters may be known a-priori as factors in managing inter-satellite handovers. In some implementations, the gateway may also have knowledge of the satellite and the power status of individual satellite beams, for example, the status indicating whether each individual satellite beam is on, off, or partially powered. The power status of a satellite and individual beams of the satellite may also be input into the inter-satellite handover algorithm. In an alternate example, a gateway may provide limited information on these parameters and a UT would manage inter-satellite handovers. In another alternate example, some of these parameters may be stored and used by a UT to manage inter-satellite handovers. In yet another alternate example, a gateway and/or UT may provide limited feedback and/or information on these parameters to a satellite, and the satellite would manage inter-satellite handovers.

The best received carrier power (best-C) and/or the best carrier to interference and noise ratio (best-CINR) estimates or measurements are used to determine whether to perform an inter-satellite handover. For example, a UT connection is handed over to a satellite beam with the best-C and/or the best CINR. Inter-satellite handover is performed based on the best-C/best-CINR by a-priori estimating or by measuring the received carrier power and/or CINR from all the satellites and beams that are visible to the UT at a given instant of time, and the satellite with the best received carrier power and/or CINR is selected. In an alternate implementation, a trigger for handover can be based on when the received CINR or the received carrier power of the current serving satellite is below a threshold. When the handover trigger occurs, the satellite with best received carrier power or CINR to the UT is selected.

In one implementation, the constraints of a UT antenna may also be considered as factors in managing inter-satellite handovers. The UT antenna may need to be mechanically rotated in azimuth and/or elevation to point to a target satellite. In one implementation, if the UT antenna does not rotate fast enough to point to a potential target satellite within a limited amount of time, for example, handover to such a potential target satellite may be skipped. Design constraints of the UT antenna such as the rate of rotation of the UT antenna in azimuth and/or elevation may be included as factors in determining whether a satellite may qualify as a target of handover and serve as a new serving satellite.

Figure 7:
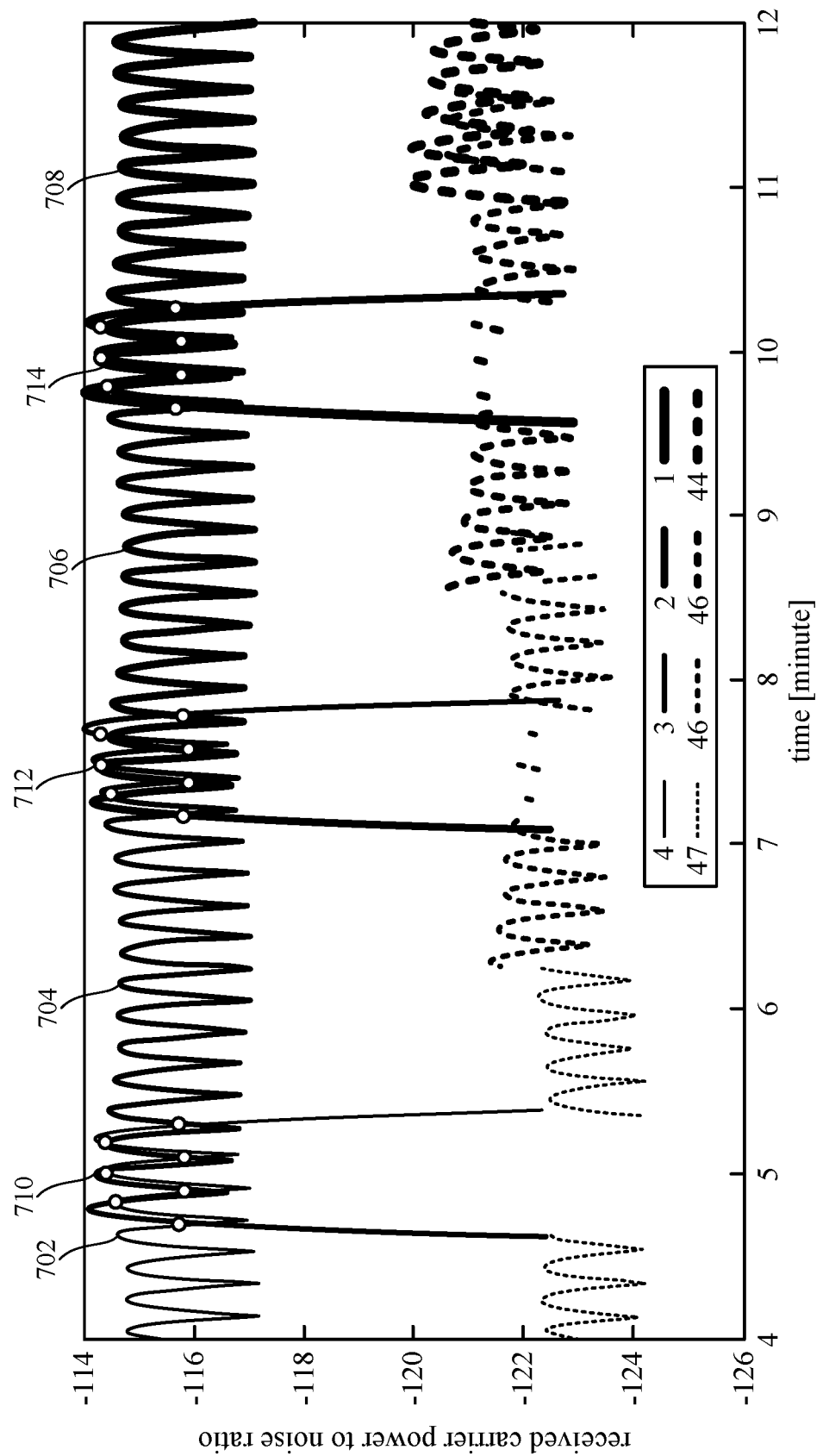
FIG. 7 is a graph of received carrier-power-to-noise ratio versus time to illustrate the beam coverage of four satellites over time as viewed from the perspective of a UT.

With such an inter-satellite handover scheme, however, back-and-forth handovers between beams of adjacent satellites may occur if the best received carrier power and/or CINR comes alternately from beams of adjacent satellites with partially overlapping footprints. For example, FIG. 7 is a graph of received carrier-power-to-noise ratio versus time to illustrate the beam coverage of four satellites over time as viewed from the perspective of a UT. The received carrier-power-to-noise ratio versus time for first, second, third and fourth satellites are illustrated as curves 702, 704, 706 and 708, respectively.

As illustrated in FIG. 7, the curves 702 and 704 of received carrier-power-to-noise ratio versus time for first and second satellites have a crossover region 710 with multiple points at which the best carrier-power-to-noise ratio could be from either the first satellite or the second satellite. Likewise, the curves 704 and 706 of received carrier-power-to-noise ratio versus time for second and third satellites have a crossover region 712 with multiple points at which the best carrier-power-to-noise ratio could be from either the second satellite or the third satellite. Similarly, the curves 706 and 708 of received carrier-power-to-noise ratio versus time for third and fourth satellites have a crossover region 714 with multiple points at which the best carrier-power-to-noise ratio could be from either the third satellite or the fourth satellite. In a region in which the best carrier-power-to-noise ratio could be from either one of two adjacent satellites, multiple handovers back and forth between the two satellites may occur within a short period of time, which would incur undesirable cost on network resources.

In an alternative scheme, a UT connection is handed over to a satellite that has a shortest distance to the UT. In this scheme, at a given instant in time, the distance between the UT and all visible satellites is computed. A satellite identified with an identification number (ID) having the minimum UT-to-satellite distance is selected only if the received CINR from the satellite is above a certain threshold. If a beam from the nearest satellite or all beams from the nearest satellite are turned off, then the next nearest satellite is selected for handoff, provided that the received CINR from the next nearest satellite is above a certain threshold. Otherwise, the UT maintains communication with the current serving satellite. In an alternate implementation, a trigger for handover can be based on when the received CINR or the received carrier power of the current serving satellite is below a threshold. When the handover trigger occurs, the list of nearest satellites to the UT is computed. A satellite having the minimum UT-to-satellite distance is selected only if the received CINR from the satellite is above a certain threshold.

In another alternative scheme, a UT connection is handed over to a satellite with the longest time of visibility. In this scheme, when the received CINR or the received carrier power of the current serving satellite is below a threshold, the visibility window of every satellite that is visible to the UT and having a received carrier power or CINR above a certain threshold is computed. The visibility window of a satellite at a given instant of time is defined as the amount of residual time that the satellite remains visible to the UT until 1) the satellite disappears or 2) the CINR falls below a certain threshold.

A satellite ID with the longest visibility window is selected as the serving satellite if the received CINR or the received carrier power from this satellite is above a certain threshold. This new serving satellite is also called a target satellite.

Figure 8:
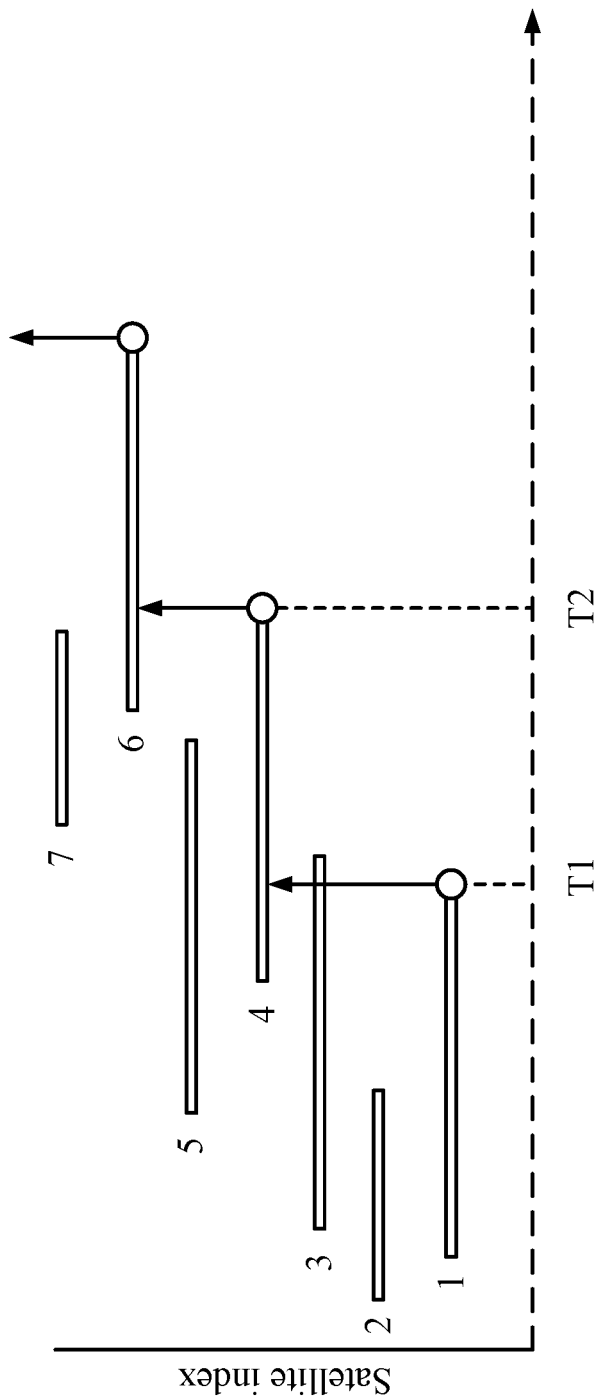
FIG. 8 is a graph illustrating an example of an inter-satellite handover scheme which selects the serving satellite based on the longest time of visibility.

FIG. 8 is a graph illustrating an example of an inter-satellite handover scheme that selects a serving satellite based on the longest time of visibility. In the example illustrated in FIG. 8, an initial serving satellite for a UT is Satellite 1 on the satellite index. At time T1, the UT reaches close to the edge of beam coverage of the current serving satellite, that is, Satellite 1, and detects that the received CINR or carrier power of Satellite 1 is falling below a certain threshold. The UT then computes the visibility windows of all UTs that are visible to the UT at time T1, including, for example, Satellites 3, 4, and 5 on the satellite index. The UT determines that Satellite 4 has the longest visibility window among Satellites 3, 4, and 5. In other words, Satellite 4 has the longest amount of residual time among Satellites 3, 4, and 5 at time T1, and is thus selected as the target satellite for handover.

After Satellite 4 has been the serving satellite for the UT for a period of time, at time T2, the UT reaches close to the edge of beam coverage of Satellite 4, and detects that the received CINR or carrier power of Satellite 4 is falling below the threshold. At time T2, the UT determines that only Satellite 6 has a visibility window that extends considerably beyond time T2, and thus selects Satellite 6 as the target satellite for handover. Upon handover from Satellite 4 to Satellite 6, Satellite 6 serves as the new serving satellite for the UT. In an alternate implementation, a gateway can compute the time T1, T2, . . . , and the target satellites IDs ID1, ID2, . . . , and provide them via a handover transition table to the UT.

In one aspect, a method of managing inter-satellite handovers is provided based on a tradeoff between competing demands of lowering the frequency of handovers and maintaining the required received CINR or carrier power. In one aspect, a sequence of satellites and beams are selected based on a tradeoff between the frequency of handovers and a defined cost function. For any duration of time, the visibility of each satellite at any instant of time in a satellite constellation can be predicted because the constellation and the movement of each satellite are deterministic, or in the case of a moving UT, information may be available by which the UT can provide its location so that the visibility of each satellite may be determined for that UT.

In one aspect, a weighted directed acyclic graph (DAG) may be described by which a sequence of handovers may be determined for a particular UT. In one aspect, each vertex of the weighted DAG represents a visible satellite (relative to some particular UT), and the arcs represent possible intersatellite handovers, where each arch has an associated weight to indicate the corresponding cost of a handover.

The weights for a weighted DAG may be described as follows. Let $s_i$ denote the unique ID of the ith satellite, and let $w_{ij}$ be the weight (cost) associated with switching from satellite $s_i$ as the serving satellite to satellite $s_j$ as the serving satellite. In order to fulfill the carrier-to-interference-and-noise ratio (CINR) and/or received carrier power requirement, a weight (cost) can be associated with each arc to reflect the impact of CINR and/or received carrier power if the handover associated with that arc is selected. The weight for handover from satellite $s_i$ to satellite $s_j$ may be determined by $$w_{ij} = a1_N|(s_i-s_j)| + (1-a)\tan h\ c(CINR_i - CINR_j),$$

where a is the weight (not to be confused with the arc weight) associated with the cost of switching vs. CINR degradation, and c is a scaling factor. The function $1_N$ is an indicator function where $1_N|(s_i-s_j)|$ equals zero if $s_i = s_j$ and equals 1 if $s_i \neq s_j$.

The above expression for the weights is simplified in that time dependence is not explicitly indicated. More precisely, the cost of a handover will vary with time. A more particular description for the weights is as follows. Consider some sequence of consecutive time instances $t_1, t_2, t_3, t_4, \ldots, t_{N-1}, t_N$. At some time instance $t_k$, let $w_{ij}(t_k)$ denote the weight (cost) in switching (i.e., a handover) from satellite $s_i$ to satellite $s_j$. The $w_{ij}(t_k)$ may be given by the same displayed equation above, but where $CINR_i$ and $CINR_j$ are determined at the time instance $t_k$.

The weighted DAG may be described as a family of sets of vertices $\{V(t_k), k=1, 2, \ldots, N\}$, where each set of vertices $V(t_k)$ is indexed by the time instance $t_k$ and is the set of visible satellites (relative to a particular UT) at the time instance $t_k$. The arcs in the weighted DAG may be described as a family of sets of arcs $\{A(t_k), k=2, \ldots, N\}$), where $A(t_k)$ is the set of arcs beginning with the set of vertices $V(t_{k-1})$ and ending with the set of vertices $V(t_k)$. That is, each arc in the set $A(t_k)$ may be represented as the ordered pair $(s_i, s_j)$ where $s_1$ is a satellite ID in the set $V(t_{k-1})$ and $s_j$ is a satellite ID in the set $V(t_k)$. The arc $(s_i, s_j)$ represents a handover from the satellite $s_i$ to satellite $s_j$ for some particular UT, and its corresponding weight is $w_{ij}(t_k)$, the cost associated with a handover at the time instance $t_k$ from the satellite $s_i$ to satellite $s_j$.

In an aspect, a sequence of handovers may be determined by finding a shortest path in the weighted DAG among all paths that begin at a satellite in the set $V(t_1)$ and end at a satellite in the set $V(t_N)$. This shortest path determines a sequence of handovers.

In another aspect, a sequence of handovers may be determined by finding a shortest path in the weighted DAG among all paths that begin at some particular satellite s' in the set $V(t_1)$ and end at a satellite in the set $V(t_N)$. For example, at the time instance $t_1$, the satellite s' may be known to be the serving satellite because of some prior scheduling, in which case the shortest path starting from that serving satellite determines a sequence of handovers.

Figure 9:
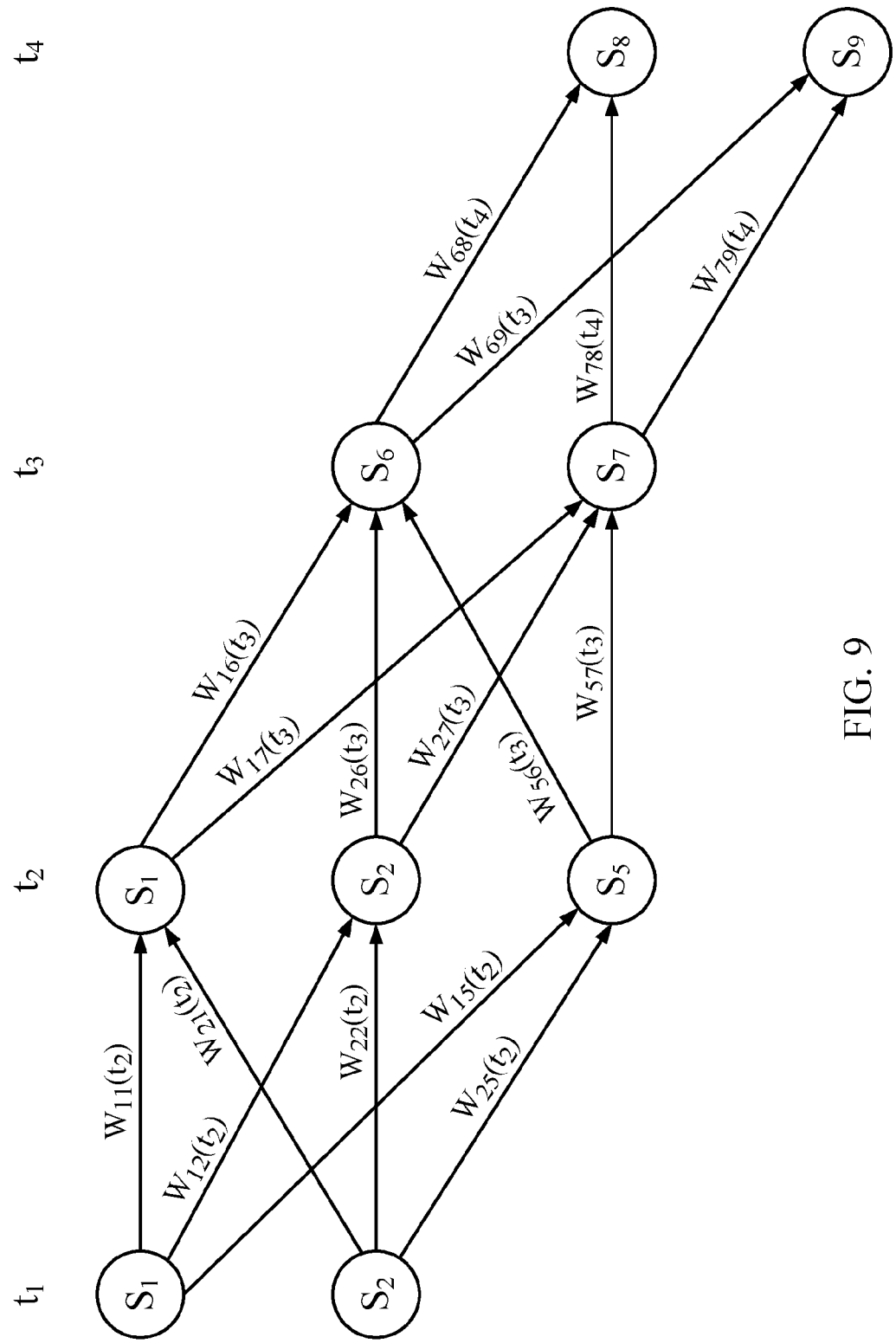
FIG. 9 is a weighted directed acyclic graph (DAG) illustrating an example of handovers according to weights based on the times of visibility of satellites from the perspective of a UT.

FIG. 9 is an example of a weighted directed acyclic graph (DAG) corresponding to the visibility of satellites in four consecutive instances of time, $t_1, t_2, t_3, t_4$. (In FIG. 9, S1, S2, etc., refers to satellite IDs.) In this graph, the shortest path (or a shortest path) can be found by using a shortest path algorithm, for example, Dijkstra's algorithm, which is known to persons skilled in the art. In one aspect, the shortest path algorithm produces the minimum cost path that corresponds to the minimum number of handovers.

In addition to the methods and apparatuses disclosed above, a serving satellite for a particular UT may be selected based on load balancing. For example, an above-described apparatus may select a new serving satellite based upon a shortest path in the weighted DAG as discussed previously, but there may be a set of satellites visible to the UT such that their beams overlap. Although a satellite in the set of satellites with overlapping beams may not be selected when considering only CINR when determining a shortest path in the DAG, that satellite may nevertheless be a better choice for a new serving satellite if load balancing is taken into account.

Accordingly an aspect may include a method or apparatus to cause a UT to be served by a new serving satellite based on load balancing, even if the new serving satellite would not be the selected satellite based on residual time left in the visibility windows or based on a shortest path in a weighted DAG as described previously. In an aspect, for a UT a determination is made of any coverage overlap region among a set of satellites, where a new serving satellite is selected from the set of satellites based on load balancing. The determining the coverage overlap region may be based on orbital constellation parameters, transmit power levels of satellite beams, and antenna gain masks.

Figure 10:
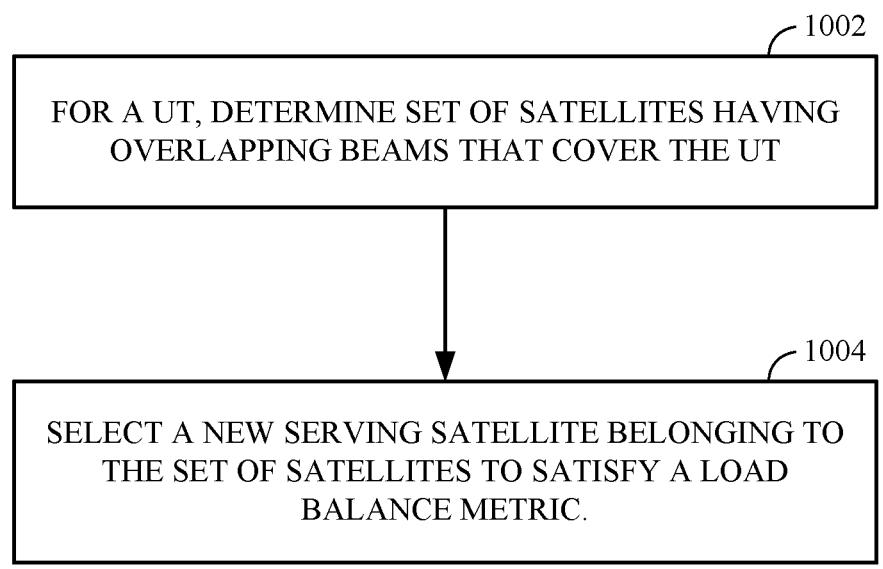
FIG. 10 illustrates a method of selecting a serving satellite based on load balancing.
Figure 11:
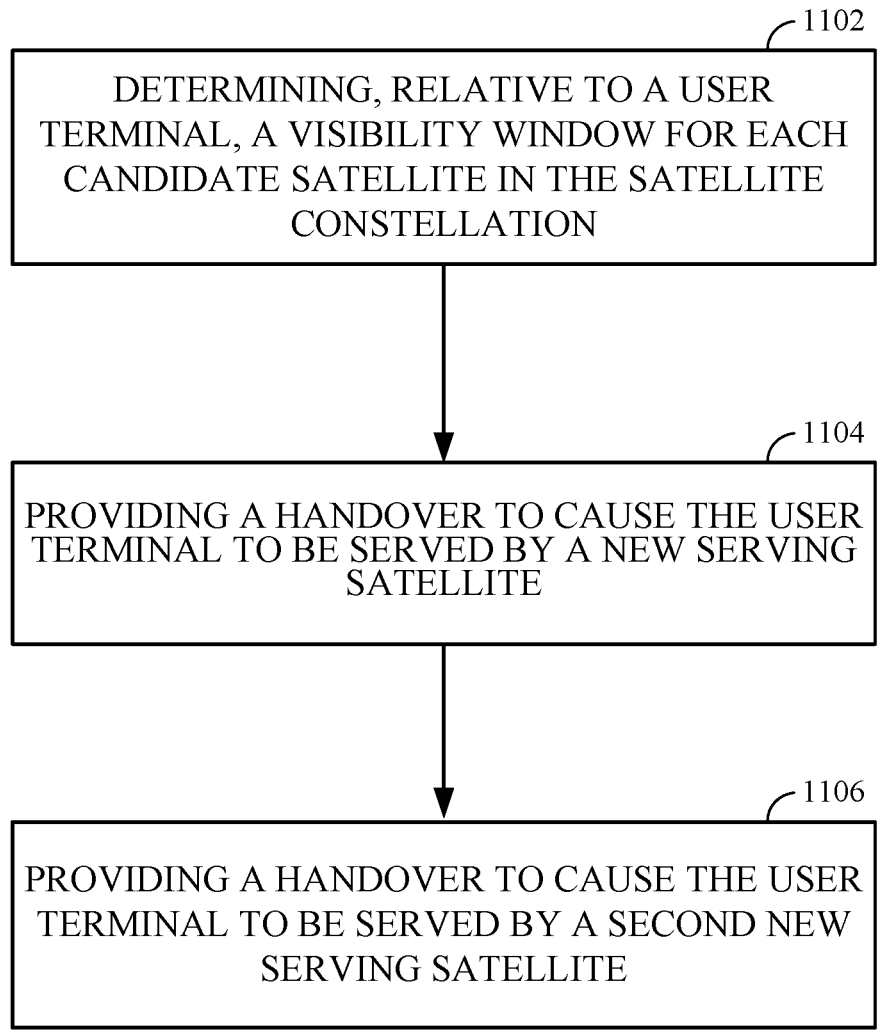
FIGS. 11-13 are flowcharts illustrating examples of managing inter-satellite handovers in a satellite communication system.

FIG. 10 illustrates a method of selecting a serving satellite based on load balancing. In 1002, for a particular UT (the selection is UT dependent), a determination is made for a set of satellites that have overlapping beams that cover the UT. In 1004, a new serving satellite is selected from this set of satellites such that a load balance metric is satisfied. The load balance metric may be any one of a number of metrics well known in the art of load balancing for efficient network communications FIG. 11 is a flowchart illustrating an aspect of a method of managing inter-satellite handover in a satellite communication system. It will be appreciated that processes indicated in FIG. 11, although illustrated in an ordered flow diagram, are not necessarily performed in the order indicated in FIG. 11. Moreover, it will be appreciated that some of the processes indicated in FIG. 11 may be optional and need not be performed by a particular apparatus. For example, some or all of the processes indicated in FIG. 11 may be performed by one or more components of a gateway, for example, the gateway controller 250 in the gateway 200 as illustrated in FIG. 2. In an alternate example, some or all of the processes may be performed by other parts of the satellite communication system, for example, by the infrastructure 116 connected to the gateways 200 and 201, as illustrated in FIG. 1. In another alternate example, some or all of the processes may be performed by one or more components of a UT, for example, the control processor 420 in the UT 400, as illustrated in FIG. 4.

Referring to the example illustrated in the flowchart of FIG. 11, a process of determining, relative to a UT, a visibility window for one or more candidate satellites in the satellite constellation is shown in block 1102. The visibility window for each candidate satellite indicates a time interval for the candidate satellite to be visible to the UT, and a parameter associated with each candidate satellite exceeds a first threshold. A process of providing a handover to cause the UT to be served by a new serving satellite among the one or more candidate satellites is shown in block 1004. The handover may be provided when a parameter associated with a serving satellite for the UT is below a second threshold, with the new serving satellite having a corresponding visibility window with a longest residual time.

In one aspect, the parameter associated with each candidate satellite may be a carrier power of the candidate satellite received by the UT. The parameter associated with the serving satellite may also be a carrier power of the serving satellite received by the UT. In addition or as an alternative, the parameter associated with each candidate satellite may be a carrier-to-interference-and-noise ratio (CINR) of the candidate satellite received by the UT. The parameter associated with the serving satellite may also be a CINR of the serving satellite received by the UT. With regard to the thresholds, the first threshold may or may not be equal to the second threshold.

In one aspect, a gateway may perform the determining relative to the UT the visibility window for each candidate satellite and providing the handover. In another aspect, the UT may perform the determining relative to the UT the visibility window for each candidate satellite and providing the handover. In another aspect, a satellite in the satellite constellation may perform the determining relative to the UT the visibility window for each candidate satellite and providing the handover.

Referring again to the example illustrated in the flowchart of FIG. 11, the method may further include a process of providing a handover to cause the UT to be served by a second new serving satellite in block 1106. As an example, the handover may cause the UT to be served by the second new serving satellite based on load balancing. Here, a coverage overlap region for a set of satellites may be determined for the UT (e.g., based on orbital constellation parameters, transmit power levels of satellite beams, and/or antenna gain masks) and the second new serving satellite may be selected from the set of satellites. As another example, the handover may cause the UT to be served by the second new serving satellite based on a distance between the UT and a plane of each candidate satellite (e.g., selecting the plane that is closest and applying the visibility window).

Figure 12:
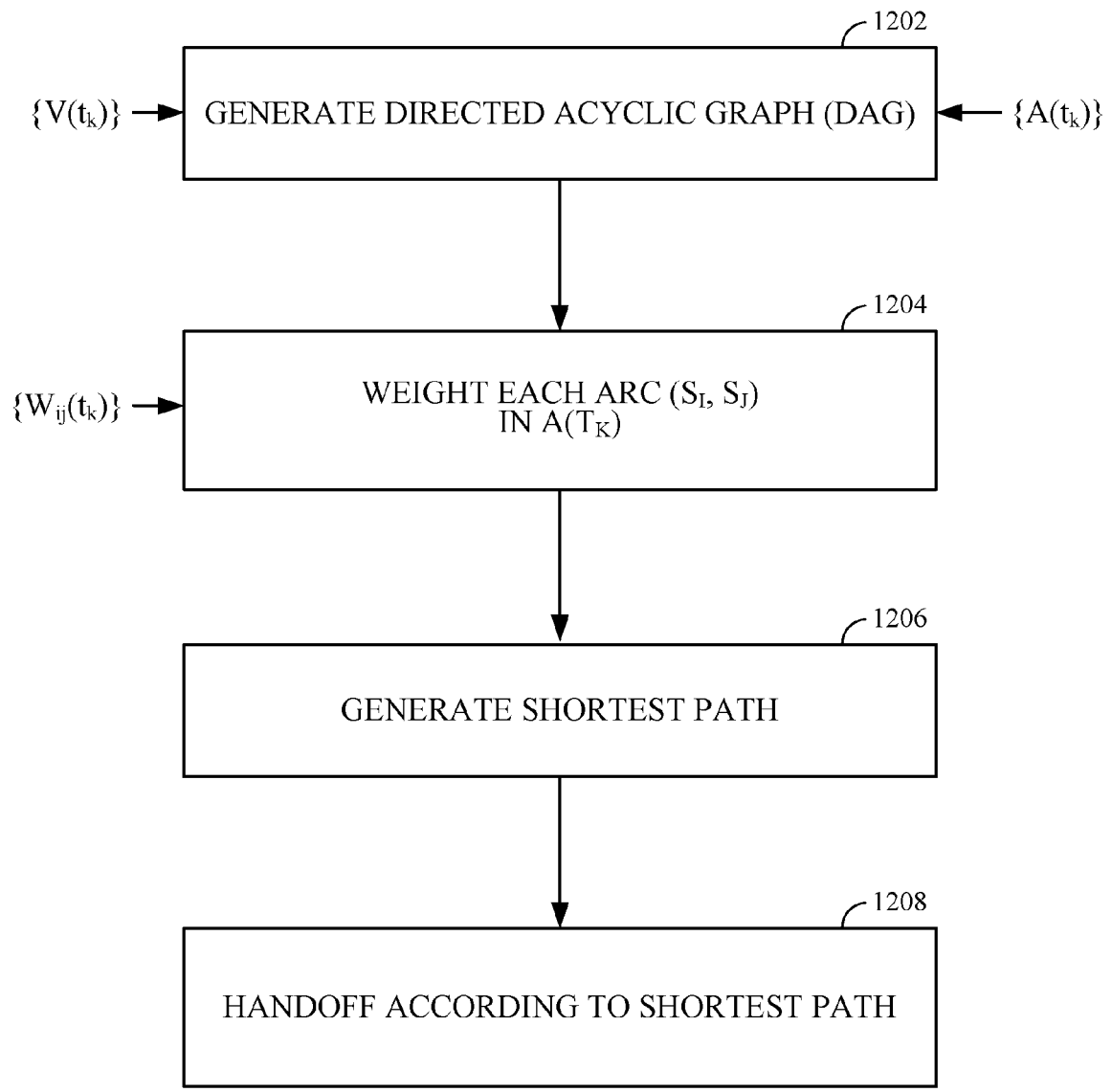

FIG. 12 is a flowchart illustrating an example of managing inter-satellite handovers in a satellite communication system based on a weighted DAG as discussed above. It will be appreciated that processes indicated in FIG. 12, although illustrated in an ordered flow diagram, are not necessarily performed in the order indicated in FIG. 12. Moreover, it will be appreciated that some of the processes indicated in FIG. 12 may be optional and need not be performed by a particular apparatus. For example, some or all of the processes indicated in FIG. 12 may be performed by one or more components of a gateway, for example, the gateway controller 250 in the gateway 200 as illustrated in FIG. 2. In an alternate example, some or all of the processes may be performed by other parts of the satellite communication system, for example, by the infrastructure 126 connected to the gateways 200 and 201, as illustrated in FIG. 1. In another alternate example, some or all of the processes may be performed by one or more components of a UT, for example, the control processor 420 in the UT 400, as illustrated in FIG. 4.

Referring to the example illustrated in the flowchart of FIG. 12, for a family of sets of vertices $\{V(t_k), k=1, 2, \ldots, N\}$, and a family of sets of arcs $\{A(t_k), k=2, \ldots, N\}$, where each arc in the set $A(t_k)$ is an ordered pair $(s_i, s_j)$ where $s_i$ is a satellite ID in the set $V(t_{k-1})$ and $s_j$ is a satellite ID in the set $V(t_k)$, a DAG is generated, as indicated in the block 1202. As discussed previously, each arc $(s_i, s_j)$ represents a handover at the time instance $t_k$ for the UT from the satellite with satellite ID $s_i$ to the satellite with satellite ID $s_j$. In the block 1202, each arc $(s_i, s_j)$ is weighted at each time instance $t_k$ with a corresponding weight $w_{ij}(t_k)$ representing a cost associated with the handover at the time instance $t_k$ for the UT from the satellite with satellite ID $s_i$ to the satellite with satellite ID $s_j$.

In the block 1206, a shortest path is generated in the weighted DAG starting at a given vertex s' in the set of vertices $V(t_1)$ and ending at a vertex in the set of vertices $V(t_N)$, and for some examples, a global shortest path is found for all starting vertices s'. In the block 1208, a handoff strategy is generated based upon the shortest path, as described previously.

In one aspect, a satellite service is considered to be in an outage if its CINR and/or received carrier power is below a certain threshold. In one example, a resource constraint shortest path (RCSP) algorithm may be used to find a path with the minimum total cost corresponding to the minimum frequency of handovers while the total outage is below a certain threshold. The RCSP algorithm is known to persons skilled in the art to find the shortest path in a network while satisfying certain constraints. Alternatively, other types of algorithms may also be implemented within the scope of the disclosure.

Figure 13:
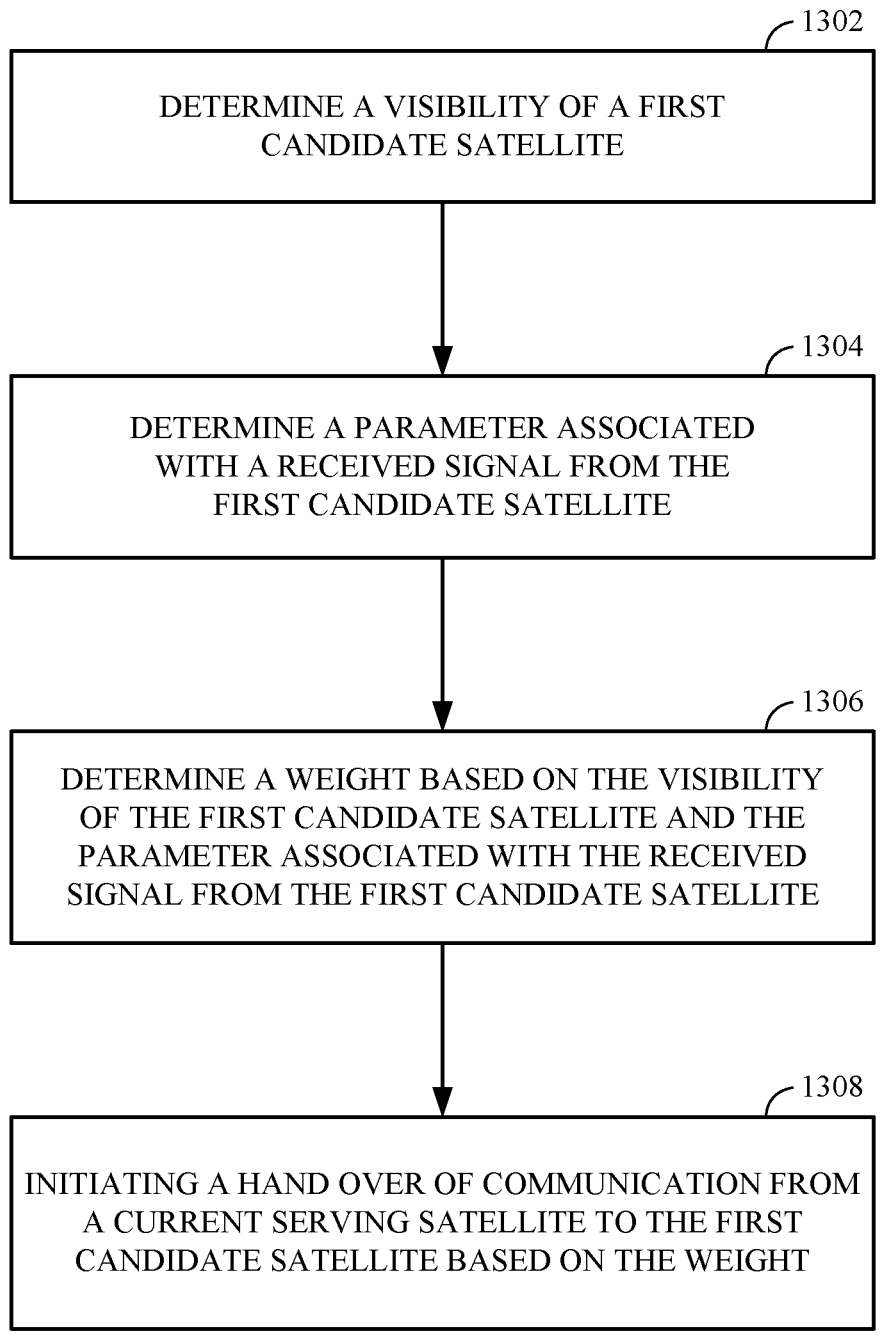

FIG. 13 is a flowchart illustrating an aspect of a method of managing inter-satellite handover in a satellite communication system. It will be appreciated that processes indicated in FIG. 13, although illustrated in an ordered flow diagram, are not necessarily performed in the order indicated in FIG. 13. Moreover, it will be appreciated that some of the processes indicated in FIG. 13 may be optional and need not be performed by a particular apparatus. For example, some or all of the processes indicated in FIG. 13 may be performed by one or more components of a gateway, for example, the gateway controller 250 in the gateway 200 as illustrated in FIG. 2. In an alternate example, some or all of the processes may be performed by other parts of the satellite communication system, for example, by the infrastructure 136 connected to the gateways 200 and 201, as illustrated in FIG. 1. In another alternate example, some or all of the processes may be performed by one or more components of a UT, for example, the control processor 420 in the UT 400, as illustrated in FIG. 4.

Referring to the example illustrated in the flowchart of FIG. 13, a process of determining a visibility of a first candidate satellite is shown in block 1302, and a process of determining a parameter associated with a received signal from the first candidate satellite is shown in block 1304. A process of determining a weight based on the visibility of the first candidate satellite and the parameter associated with the received signal from the first candidate satellite is shown in block 1306. Furthermore, a process of initiating a hand over of communication from a current serving satellite to the first candidate satellite based on the weight is shown in block 1308.

In one aspect, the parameter associated with the received signal comprises received carrier power from the first candidate satellite. In another aspect, the parameter associated with the received signal comprises carrier-to-interference-and-noise ratio (CINR) of the received signal from the first candidate satellite. In one aspect, the process of determining the visibility of the first candidate satellite comprises determining a visibility window of the first candidate satellite.

In one aspect, the process of determining the visibility window of the first candidate satellite comprises determining an amount of residual time that the first candidate satellite remains visible until the first candidate satellite disappears or until the parameter associated with the received signal from the first candidate satellite does not satisfy a threshold. For example, the visibility window may be computed by determining the amount of residual time that the first candidate satellite remains visible to a UT until the carrier power received by the UT from the first candidate satellite falls below a threshold. In another example, the visibility window may be computed by determining the amount of residual time that the first candidate satellite remains visible to the UT until the CINR of the carrier signal received by the UT from the first candidate satellite falls below a threshold.

In one aspect, the visibility of a second candidate satellite and a parameter associated with a received signal from the second candidate satellite are determined. For example, the parameter associated with the received signal from the second candidate satellite may be received carrier power, or alternatively, the CINR of the carrier signal received by the UT from the second candidate satellite. In one aspect, a weight based on the visibility of the second candidate satellite and the parameter associated with the received signal from the second candidate satellite is determined. In one aspect, the visibility window of the second candidate satellite is computed by determining an amount of residual time that the second candidate satellite remains visible until the second candidate satellite disappears or until the parameter associated with the received signal from the second candidate satellite does not satisfy the threshold.

In one aspect, a determination is made as to whether the computed weight of the first or the second candidate satellite is greater, and the candidate satellite that has the greater weight is selected as the new serving satellite. In another aspect, a determination is made as to whether the visibility window of the first or the second candidate satellite is longer, and the candidate satellite that has the longer visibility window is selected as the new serving satellite.

In one implementation, some or all of the processes of managing inter-satellite handover described above may be performed by a gateway or infrastructure, which, after determining which one of the candidate satellites should become a new serving satellite as a target of handover, sends one or more commands to the UT, which actually performs the handover. In another implementation, some or all of the processes of managing inter-satellite handover described above may be performed by the UT that actually performs the handover.

Figure 14:
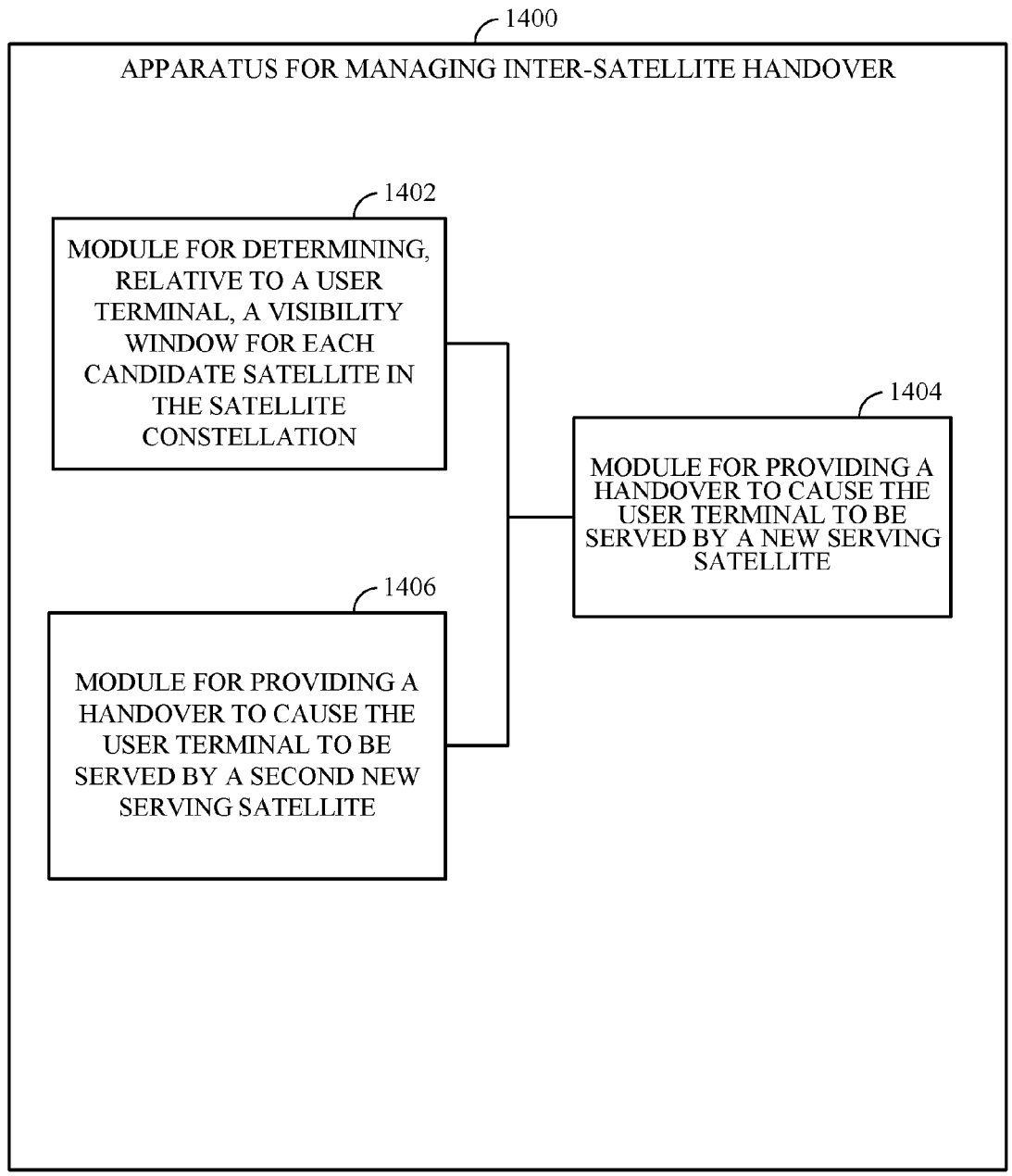
FIGS. 14-16 illustrate examples of an apparatus for managing inter-satellite handovers represented as a series of interrelated functional modules.

FIG. 14 illustrates an example of an apparatus 1400 for managing inter-satellite handover, represented as a series of interrelated functional modules. A module 1402 for determining a visibility may correspond, at least in some aspects to, for example, a gateway or a component thereof as discussed herein (e.g., the gateway controller 250 or the like), or alternatively, a UT or a component thereof as discuss herein (e.g., the control processor 420 or the like). A module 1404 for providing a handover may correspond, at least in some aspects to, for example, a gateway or a component thereof as discussed herein (e.g., the gateway controller 250 or the like), or alternatively, a UT or a component thereof as discuss herein (e.g., the control processor 420 or the like). A module 1406 for providing a handover may correspond, at least in some aspects to, for example, a gateway or a component thereof as discussed herein (e.g., the gateway controller 250 or the like), or alternatively, a UT or a component thereof as discuss herein (e.g., the control processor 420 or the like).

Figure 15:
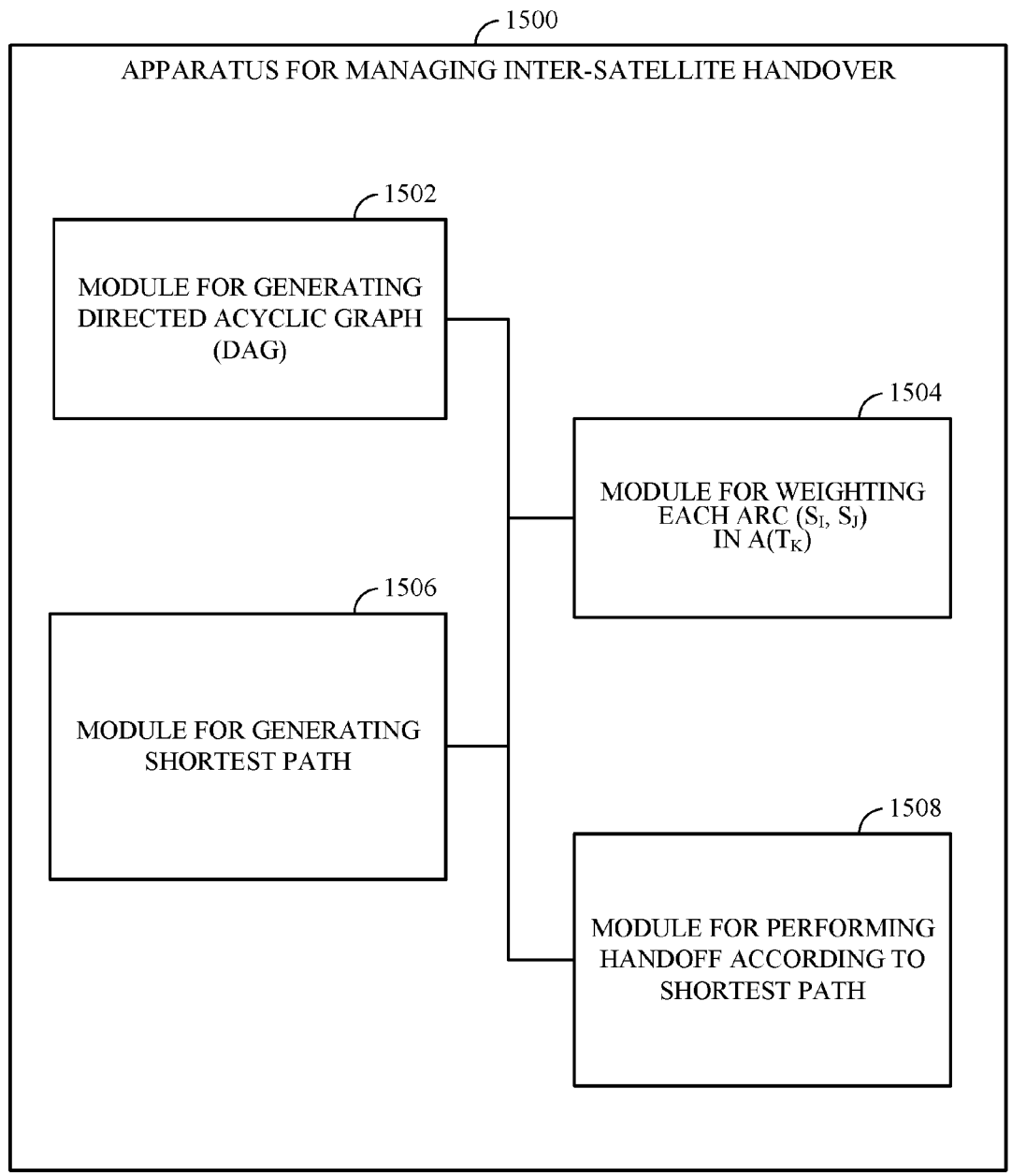

FIG. 15 illustrates an example of an apparatus 1500 for managing inter-satellite handover, represented as a series of interrelated functional modules. A module 1502 for generating a DAG may correspond, at least in some aspects to, for example, a gateway or a component thereof as discussed herein (e.g., the gateway controller 250 or the like), or alternatively, a UT or a component thereof as discuss herein (e.g., the control processor 420 or the like). A module 1504 for weighting may correspond, at least in some aspects to, for example, a gateway or a component thereof as discussed herein (e.g., the gateway controller 250 or the like), or alternatively, a UT or a component thereof as discuss herein (e.g., the control processor 420 or the like). A module 1506 for generating may correspond, at least in some aspects to, for example, a gateway or a component thereof as discussed herein (e.g., the gateway controller 250 or the like), or alternatively, a UT or a component thereof as discuss herein (e.g., the control processor 420 or the like). A module 1508 for performing handoff may correspond, at least in some aspects to, for example, a gateway or a component thereof as discussed herein (e.g., the gateway controller 250 or the like), or alternatively, a UT or a component thereof as discuss herein (e.g., the control processor 420 or the like).

Figure 16:
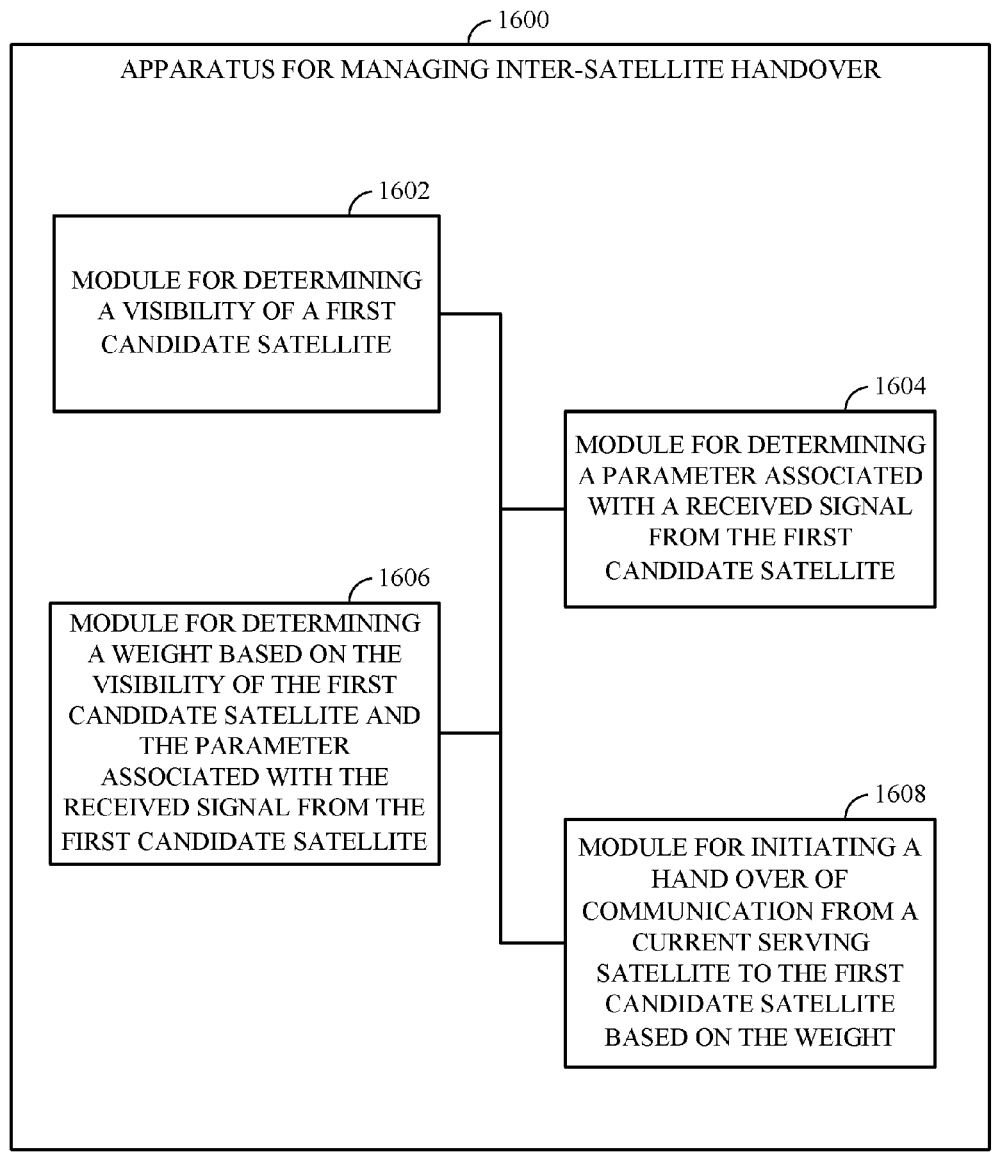

FIG. 16 illustrates an example of an apparatus 1600 for managing inter-satellite handover, represented as a series of interrelated functional modules. A module 1602 for determining a visibility of a first candidate satellite may correspond, at least in some aspects to, for example, a gateway or a component thereof as discussed herein (e.g., the gateway controller 250 or the like), or alternatively, a UT or a component thereof as discuss herein (e.g., the control processor 420 or the like). A module 1604 for determining a parameter associated with a received signal from the first candidate satellite may correspond, at least in some aspects to, for example, a gateway or a component thereof as discussed herein (e.g., the gateway controller 250 or the like), or alternatively, a UT or a component thereof as discuss herein (e.g., the control processor 420 or the like). A module 1606 for determining a weight based on the visibility of the first candidate satellite and the parameter associated with the received signal from the first candidate satellite may correspond, at least in some aspects to, for example, a gateway or a component thereof as discussed herein (e.g., the gateway controller 250 or the like), or alternatively, a UT or a component thereof as discuss herein (e.g., the control processor 420 or the like). A module 1608 for initiating a hand over of communication from a current serving satellite to the first candidate satellite based on the weight may correspond, at least in some aspects to, for example, a gateway or a component thereof as discussed herein (e.g., the gateway controller 250 or the like), or alternatively, a UT or a component thereof as discuss herein (e.g., the control processor 420 or the like).

The functionality of the modules of FIGS. 14-16 may be implemented in various ways consistent with the teachings herein. In some designs, the functionality of these modules may be implemented as one or more electrical components. In some designs, the functionality of these modules may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 14-16, as well as other components and functions described herein, may be implemented using any suitable means. Such means also may be implemented, at least in part, using corresponding structure as taught herein. For example, the components described above in conjunction with the "module for" components of FIGS. 14-16 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor.

Accordingly, aspects of the claimed subject matter may include a non-transitory computer-readable media embodying a method for spectral efficient data transmission in satellite systems. Accordingly, the claimed subject matter is not limited to illustrated examples.

While the foregoing disclosure shows illustrative aspects of the claimed subject matter, it should be noted that various changes and modifications could be made herein without departing from the scope of the disclosure as defined by the appended claims. The functions, steps and/or actions of the method claims in accordance with the description herein need not be performed in any particular order. Furthermore, although aspects of the claimed subject matter may be described or claimed in the singular, the plural is contemplated unless limitation to the singular is explicitly stated.

What is claimed is:

1. A method to manage inter-satellite handovers in a satellite constellation, the method comprising:

determining, relative to a user terminal, a visibility window for two or more candidate satellites in the satellite constellation, wherein the visibility window for each candidate satellite indicates a time interval for the candidate satellite to be visible to the user terminal, and wherein a parameter associated with each candidate satellite exceeds a first threshold; and providing, when a parameter associated with a serving satellite for the user terminal is below a second threshold, a handover to cause the user terminal to be served by a new serving satellite among the two or more candidate satellites, the new serving satellite having a corresponding visibility window with a longest residual time among the two or more candidate satellites.

2. The method of claim 1, wherein the parameter associated with each candidate satellite is a carrier power of the candidate satellite received by the user terminal.

3. The method of claim 2, wherein the parameter associated with the serving satellite is a carrier power of the serving satellite received by the user terminal.

4. The method of claim 1, wherein the parameter associated with each candidate satellite is a carrier-to-interference-and-noise ratio (CINR) of the candidate satellite received by the user terminal.

5. The method of claim 4, wherein the parameter associated with the serving satellite is a CINR of the serving satellite received by the user terminal.

6. The method of claim 1, wherein a gateway performs the determining relative to the user terminal the visibility window for each candidate satellite and providing the handover.

7. The method of claim 1, wherein the user terminal performs the determining relative to the user terminal the visibility window for each candidate satellite and providing the handover.

8. The method of claim 1, wherein a satellite in the satellite constellation performs the determining relative to the user terminal the visibility window for each candidate satellite and providing the handover.

9. The method of claim 1, further comprising:
providing a handover to cause the user terminal to be served by a second new serving satellite based on load balancing.

10. The method of claim 9, further comprising:
determining for the user terminal a coverage overlap region for a set of satellites;
selecting the second new serving satellite from the set of satellites.

11. The method of claim 10, wherein the determining the coverage overlap region is based on at least one of orbital constellation parameters, transmit power levels of satellite beams, antenna gain masks, or a combination thereof.

12. The method of claim 1, further comprising:
providing a handover to cause the user terminal to be served by a second new serving satellite based on a distance between the user terminal and a plane of each candidate satellite.

13. An apparatus to manage inter-satellite handovers in a satellite constellation, the apparatus comprising
at least one processor; and
at least one memory coupled to the at least one processor, the at least one processor and the at least one memory being configured to:
determine, relative to a user terminal, a visibility window for two or more candidate satellites in the satellite constellation, wherein the visibility window for each candidate satellite indicates a time interval for the candidate satellite to be visible to the user terminal, and wherein a parameter associated with each candidate satellite exceeds a first threshold; and provide, when a parameter associated with a serving satellite for the user terminal is below a second threshold, a handover to cause the user terminal to be served by a new serving satellite among the two or more candidate satellites, the new serving satellite having a corresponding visibility window with a longest residual time among the two or more candidate satellites.

14. The apparatus of claim 13, wherein the parameter associated with each candidate satellite and serving satellite is a carrier power or carrier-to-interference-and-noise ratio (CINR) received by the user terminal.

15. The apparatus of claim 13, wherein the apparatus comprises a gateway, a user terminal, or a satellite in constellation to determine the visibility window for each candidate satellite and provide the handover.

16. The apparatus of claim 13, wherein the at least one processor and the at least one memory are further configured to:

provide a handover to cause the user terminal to be served by a second new serving satellite based on load balancing.

17. The apparatus of claim 16, wherein the at least one processor and the at least one memory are further configured to:

determine for the user terminal a coverage overlap region for a set of satellites; and select the second new serving satellite from the set of satellites.

18. The apparatus of claim 17, wherein the determining the coverage overlap region is based on at least one of orbital constellation parameters, transmit power levels of satellite beams, antenna gain masks, or a combination thereof.

19. An apparatus to manage inter-satellite handovers in a satellite constellation, the apparatus comprising:

means for determining, relative to a user terminal, a visibility window for two or more candidate satellites in the satellite constellation, wherein the visibility window for each candidate satellite indicates a time interval for the candidate satellite to be visible to the user terminal, and wherein a parameter associated with each candidate satellite exceeds a first threshold; and means for providing, when a parameter associated with a serving satellite for the user terminal is below a second threshold, a handover to cause the user terminal to be served by a new serving satellite among the two or more candidate satellites, the new serving satellite having a corresponding visibility window with a longest residual time among the two or more candidate satellites.

20. A non-transitory computer-readable medium having instructions stored thereon that cause at least one processor to perform a method comprising:

managing inter-satellite handovers in a satellite constellation;

determining, relative to a user terminal, a visibility window for two or more candidate satellites in the satellite constellation, wherein the visibility window for each candidate satellite indicates a time interval for the candidate satellite to be visible to the user terminal, and wherein a parameter associated with each candidate satellite exceeds a first threshold; and providing, when a parameter associated with a serving satellite for the user terminal is below a second threshold, a handover to cause the user terminal to be served by a new serving satellite among the two or more candidate satellites, the new serving satellite having a corresponding visibility window with a longest residual time among the two or more candidate satellites.

* * * * *